(12) United States Patent
Zaytsev et al.

(10) Patent No.: US 11,263,620 B2
(45) Date of Patent: Mar. 1, 2022

(54) CONSUMER DEVICE PAYMENT TOKEN MANAGEMENT

(71) Applicant: GROUPON, INC., Chicago, IL (US)

(72) Inventors: Andrey Zaytsev, Los Altos, CA (US); Ulf Schwekendiek, San Francisco, CA (US); Tuomas Artman, San Francisco, CA (US)

(73) Assignee: Groupon, Inc., Chicago, IL (US)

( * ) Notice: Subject to any disclaimer, the term of this patent is extended or adjusted under 35 U.S.C. 154(b) by 0 days.

(21) Appl. No.: 16/196,918

(22) Filed: Nov. 20, 2018

(65) Prior Publication Data

US 2019/0295066 A1    Sep. 26, 2019

Related U.S. Application Data

(63) Continuation of application No. 13/764,753, filed on Feb. 11, 2013, now abandoned.

(51) Int. Cl.
*G06Q 20/36*    (2012.01)
*G06Q 20/20*    (2012.01)
(Continued)

(52) U.S. Cl.
CPC .............. *G06Q 20/36* (2013.01); *G06Q 20/20* (2013.01); *G06Q 20/327* (2013.01);
(Continued)

(58) Field of Classification Search
CPC ...... G06Q 20/36; G06Q 20/20; G06Q 20/327; G06Q 20/382; G06Q 20/3823; G06Q 20/12; G06Q 20/3825; G06Q 20/401
See application file for complete search history.

(56) References Cited

U.S. PATENT DOCUMENTS 2,153,480 A    4/1939   Pierce
6,208,468 B1   3/2001   Togino et al.
(Continued)

FOREIGN PATENT DOCUMENTS

EP    1017030 A2    7/2000
EP    2909799 A1    8/2015
(Continued)

OTHER PUBLICATIONS

U.S. Appl. No. 13/764,753, dated Feb. 11, 2013.
(Continued)

*Primary Examiner* — Joseph W. King
*Assistant Examiner* — Pierre L Maccagno
(74) *Attorney, Agent, or Firm* — Alston & Bird LLP

(57) ABSTRACT

Systems and related methods for facilitating payments via a consumer device carried by a consumer are discussed herein. Wallet identifying tokens may be used to secure messages between the consumer device and the merchant device over a wireless link. For example, the merchant device may include circuitry configured to wirelessly receive a wallet identifying token from a consumer device and to transmit the wallet identifying token to the central system. In response, consumer identifying data associated with the wallet identifying token may be received by the merchant device from the central system. In some embodiments, payments may be secured via limiting the lifetime of wallet identifying tokens after initial use.

20 Claims, 10 Drawing Sheets

(51) Int. Cl.
*G06Q 20/32* (2012.01)
*G06Q 20/38* (2012.01)
*G06Q 20/40* (2012.01)

(52) U.S. Cl.
CPC ....... *G06Q 20/382* (2013.01); *G06Q 20/3823* (2013.01); *G06Q 20/3825* (2013.01); *G06Q 20/401* (2013.01)

(56) References Cited

U.S. PATENT DOCUMENTS

| | | | |
|---|---|---|---|
| 6,327,578 | B1 | 12/2001 | Linehan |
| 6,487,180 | B1 | 11/2002 | Borgstahl et al. |
| 6,764,013 | B2 | 7/2004 | Ben-Aissa |
| 6,812,851 | B1 | 11/2004 | Dukach et al. |
| 6,873,974 | B1 | 3/2005 | Schutzer |
| 7,177,847 | B2 | 2/2007 | Atkinson et al. |
| 7,229,013 | B2 | 6/2007 | Ben-Aissa |
| 7,411,491 | B2 * | 8/2008 | Klabunde ........... A61B 5/0006 340/539.12 |
| 7,475,813 | B2 | 1/2009 | Swanson, Sr. |
| 7,527,194 | B2 * | 5/2009 | Truitt ................ G06Q 20/16 235/379 |
| 7,584,118 | B1 | 9/2009 | Bellare et al. |
| 7,609,821 | B2 | 10/2009 | Delaney et al. |
| 7,653,883 | B2 | 1/2010 | Hotelling et al. |
| 7,774,231 | B2 | 8/2010 | Pond et al. |
| 7,891,560 | B2 | 2/2011 | Hammad |
| 7,934,986 | B2 | 5/2011 | Kane et al. |
| 8,045,967 | B2 | 10/2011 | Lovegreen et al. |
| 8,131,619 | B1 | 3/2012 | Veselka |
| 8,224,700 | B2 | 7/2012 | Silver |
| 8,229,853 | B2 | 7/2012 | Dispensa et al. |
| 8,284,061 | B1 | 10/2012 | Dione |
| 8,370,264 | B1 | 2/2013 | Wei et al. |
| 8,844,002 | B2 * | 9/2014 | Monahan ............ H04L 63/10 726/5 |
| 9,117,231 | B2 | 8/2015 | Rodgers et al. |
| 9,576,286 | B1 | 2/2017 | Artman et al. |
| 9,674,050 | B2 | 6/2017 | Martin et al. |
| 9,852,409 | B2 * | 12/2017 | Artman ................ G06Q 20/20 |
| 10,148,659 | B2 * | 12/2018 | Nandakumar ...... H04L 63/0407 |
| 2001/0029496 | A1 | 10/2001 | Otto et al. |
| 2002/0017561 | A1 | 2/2002 | Tomoike |
| 2002/0029342 | A1 | 3/2002 | Keech |
| 2002/0072921 | A1 | 6/2002 | Boland et al. |
| 2002/0073044 | A1 | 6/2002 | Singhal |
| 2002/0077993 | A1 | 6/2002 | Immonen et al. |
| 2002/0083342 | A1 | 6/2002 | Webb et al. |
| 2002/0107610 | A1 | 8/2002 | Kaehler et al. |
| 2002/0107791 | A1 | 8/2002 | Nobrega et al. |
| 2002/0142753 | A1 | 10/2002 | Pecen et al. |
| 2002/0151313 | A1 | 10/2002 | Stead |
| 2002/0174023 | A1 | 11/2002 | Grey et al. |
| 2003/0037113 | A1 | 2/2003 | Petrovykh |
| 2003/0088682 | A1 | 5/2003 | Hlasny |
| 2003/0172036 | A1 | 9/2003 | Feigenbaum |
| 2003/0208409 | A1 | 11/2003 | Mault |
| 2004/0030601 | A1 | 2/2004 | Pond et al. |
| 2004/0116074 | A1 | 6/2004 | Fujii et al. |
| 2004/0143473 | A1 | 7/2004 | Tivey et al. |
| 2005/0028082 | A1 | 2/2005 | Topalov et al. |
| 2005/0043996 | A1 | 2/2005 | Silver |
| 2005/0182680 | A1 | 8/2005 | Jones et al. |
| 2005/0187873 | A1 | 8/2005 | Labrou et al. |
| 2005/0256841 | A1 | 11/2005 | Rawat et al. |
| 2005/0273345 | A1 | 12/2005 | Castillejo Romero |
| 2006/0069763 | A1 | 3/2006 | Kido |
| 2006/0085267 | A1 | 4/2006 | Lovegreen et al. |
| 2006/0122855 | A1 | 6/2006 | Prorock |
| 2006/0156060 | A1 | 7/2006 | Forrer et al. |
| 2006/0165060 | A1 | 7/2006 | Dua |
| 2006/0178943 | A1 | 8/2006 | Rollinson et al. |
| 2006/0218043 | A1 | 9/2006 | Rosenzweig et al. |
| 2007/0012763 | A1 | 1/2007 | Van et al. |
| 2007/0061209 | A1 | 3/2007 | Jackson |
| 2007/0150371 | A1 | 6/2007 | Gangji |
| 2007/0162337 | A1 | 7/2007 | Hawkins et al. |
| 2007/0219923 | A1 | 9/2007 | Shea et al. |
| 2007/0250355 | A1 | 10/2007 | Leet et al. |
| 2007/0280269 | A1 | 12/2007 | Rosenberg |
| 2007/0282739 | A1 | 12/2007 | Thomsen |
| 2007/0291915 | A1 * | 12/2007 | Tseitlin ................ G06Q 20/105 379/114.04 |
| 2008/0010193 | A1 | 1/2008 | Rackley et al. |
| 2008/0051122 | A1 | 2/2008 | Fisher |
| 2008/0064374 | A1 | 3/2008 | Coffing |
| 2008/0065374 | A1 | 3/2008 | Mittal et al. |
| 2008/0065490 | A1 | 3/2008 | Novick et al. |
| 2008/0097851 | A1 | 4/2008 | Bemmel et al. |
| 2008/0143487 | A1 | 6/2008 | Hulvey |
| 2008/0147546 | A1 | 6/2008 | Weichselbaumer et al. |
| 2008/0162318 | A1 | 7/2008 | Butler et al. |
| 2008/0182616 | A1 | 7/2008 | Connors et al. |
| 2008/0208744 | A1 | 8/2008 | Arthur et al. |
| 2008/0222004 | A1 | 9/2008 | Pollock et al. |
| 2009/0030749 | A1 | 1/2009 | Drummond et al. |
| 2009/0037286 | A1 | 2/2009 | Foster |
| 2009/0063312 | A1 | 3/2009 | Hurst |
| 2009/0070263 | A1 | 3/2009 | Davis et al. |
| 2009/0076896 | A1 | 3/2009 | Dewitt et al. |
| 2009/0167553 | A1 | 7/2009 | Hong et al. |
| 2009/0192935 | A1 | 7/2009 | Griffin et al. |
| 2009/0204881 | A1 | 8/2009 | Murthy et al. |
| 2009/0271295 | A1 | 10/2009 | Hodge |
| 2010/0082481 | A1 | 4/2010 | Lin et al. |
| 2010/0094701 | A1 | 4/2010 | Ghosh et al. |
| 2010/0145861 | A1 | 6/2010 | Law et al. |
| 2010/0250549 | A1 | 9/2010 | Muller et al. |
| 2010/0252624 | A1 | 10/2010 | Van et al. |
| 2010/0274680 | A1 | 10/2010 | Carlson et al. |
| 2010/0276484 | A1 | 11/2010 | Banerjee et al. |
| 2010/0320266 | A1 | 12/2010 | White |
| 2010/0325047 | A1 | 12/2010 | Carlson et al. |
| 2011/0010422 | A1 | 1/2011 | Bezancon et al. |
| 2011/0029362 | A1 | 2/2011 | Roeding et al. |
| 2011/0029370 | A1 | 2/2011 | Roeding et al. |
| 2011/0041170 | A1 | 2/2011 | Wankmueller |
| 2011/0047608 | A1 | 2/2011 | Levenberg |
| 2011/0055005 | A1 | 3/2011 | Lang |
| 2011/0088087 | A1 | 4/2011 | Kalbratt |
| 2011/0173096 | A1 * | 7/2011 | Bui ................ G06Q 30/0641 705/26.41 |
| 2011/0191196 | A1 | 8/2011 | Orr et al. |
| 2011/0218911 | A1 | 9/2011 | Spodak |
| 2011/0238499 | A1 | 9/2011 | Blackhurst et al. |
| 2011/0313867 | A9 | 12/2011 | Silver |
| 2011/0320293 | A1 | 12/2011 | Khan |
| 2012/0016745 | A1 | 1/2012 | Hendrickson |
| 2012/0029990 | A1 | 2/2012 | Fisher |
| 2012/0030066 | A1 | 2/2012 | Stringfellow et al. |
| 2012/0036042 | A1 | 2/2012 | Graylin et al. |
| 2012/0072311 | A1 | 3/2012 | Khan |
| 2012/0088487 | A1 | 4/2012 | Khan |
| 2012/0095852 | A1 | 4/2012 | Bauer et al. |
| 2012/0136754 | A1 | 5/2012 | Underwood |
| 2012/0150669 | A1 | 6/2012 | Langley et al. |
| 2012/0158528 | A1 | 6/2012 | Hsu et al. |
| 2012/0158541 | A1 | 6/2012 | Ganti et al. |
| 2012/0172062 | A1 | 7/2012 | Altman et al. |
| 2012/0173350 | A1 | 7/2012 | Robson |
| 2012/0173431 | A1 | 7/2012 | Ritchie et al. |
| 2012/0179528 | A1 | 7/2012 | Ortiz et al. |
| 2012/0209729 | A1 | 8/2012 | Lovegreen |
| 2012/0209730 | A1 | 8/2012 | Garrett |
| 2012/0233005 | A1 | 9/2012 | White |
| 2012/0239417 | A1 | 9/2012 | Pourfallah et al. |
| 2012/0239560 | A1 | 9/2012 | Pourfallah et al. |
| 2012/0246079 | A1 | 9/2012 | Wilson et al. |
| 2012/0253908 | A1 | 10/2012 | Ouimet et al. |
| 2012/0253913 | A1 | 10/2012 | Postrel |
| 2012/0254020 | A1 | 10/2012 | Debow |
| 2012/0271697 | A1 | 10/2012 | Gilman et al. |
| 2012/0271759 | A1 | 10/2012 | Lee |

(56) References Cited

U.S. PATENT DOCUMENTS

| | | | |
|---|---|---|---|
| 2012/0290376 A1* | 11/2012 | Dryer | G06Q 20/3278 705/14.23 |
| 2012/0290449 A1 | 11/2012 | Mullen et al. | |
| 2012/0310743 A1 | 12/2012 | Johri | |
| 2012/0317628 A1 | 12/2012 | Yeager | |
| 2012/0323664 A1 | 12/2012 | Klems | |
| 2012/0330769 A1 | 12/2012 | Arceo | |
| 2013/0024364 A1 | 1/2013 | Shrivastava et al. | |
| 2013/0036048 A1 | 2/2013 | Campos et al. | |
| 2013/0036051 A1* | 2/2013 | Giordano | G06Q 20/325 705/44 |
| 2013/0046634 A1 | 2/2013 | Grigg et al. | |
| 2013/0047242 A1 | 2/2013 | Radhakrishnan | |
| 2013/0073365 A1 | 3/2013 | Mccarthy | |
| 2013/0097031 A1 | 4/2013 | Royyuru et al. | |
| 2013/0138518 A1 | 5/2013 | White et al. | |
| 2013/0144731 A1 | 6/2013 | Baldwin et al. | |
| 2013/0151357 A1 | 6/2013 | Havas et al. | |
| 2013/0159080 A1 | 6/2013 | Wu et al. | |
| 2013/0159119 A1 | 6/2013 | Henderson et al. | |
| 2013/0159181 A1 | 6/2013 | Hueck | |
| 2013/0173475 A1 | 7/2013 | Lund | |
| 2013/0191174 A1 | 7/2013 | Zhou et al. | |
| 2013/0191227 A1 | 7/2013 | Pasa et al. | |
| 2013/0282438 A1 | 10/2013 | Hunter et al. | |
| 2013/0282533 A1 | 10/2013 | Foran-Owens | |
| 2013/0304642 A1 | 11/2013 | Campos | |
| 2013/0317928 A1 | 11/2013 | Laracey | |
| 2013/0339233 A1 | 12/2013 | Lee et al. | |
| 2013/0346302 A1 | 12/2013 | Purves et al. | |
| 2014/0006182 A1 | 1/2014 | Wilson | |
| 2014/0006205 A1 | 1/2014 | Berry et al. | |
| 2014/0032297 A1 | 1/2014 | Germann et al. | |
| 2014/0037193 A1 | 2/2014 | El et al. | |
| 2014/0058862 A1 | 2/2014 | Celkonas | |
| 2014/0058938 A1 | 2/2014 | Mcclung, III | |
| 2014/0067677 A1 | 3/2014 | Ali et al. | |
| 2014/0074655 A1 | 3/2014 | Lim et al. | |
| 2014/0099981 A1 | 4/2014 | Horbal | |
| 2014/0100973 A1 | 4/2014 | Brown et al. | |
| 2014/0108108 A1 | 4/2014 | Artman et al. | |
| 2014/0108247 A1* | 4/2014 | Artman | G06Q 20/20 705/44 |
| 2014/0114776 A1 | 4/2014 | Solanki et al. | |
| 2014/0143018 A1 | 5/2014 | Nies et al. | |
| 2014/0229375 A1* | 8/2014 | Zaytzsev | G06Q 20/382 705/44 |
| 2014/0244354 A1 | 8/2014 | Seifert | |
| 2014/0310117 A1 | 10/2014 | Moshal | |
| 2014/0344153 A1 | 11/2014 | Raj et al. | |
| 2015/0046276 A1 | 2/2015 | Artman et al. | |
| 2015/0095133 A1 | 4/2015 | Parker et al. | |
| 2015/0095134 A1 | 4/2015 | Parker et al. | |
| 2015/0269557 A1 | 9/2015 | Artman et al. | |
| 2019/0295066 A1* | 9/2019 | Zaytzsev | G06Q 20/382 |

FOREIGN PATENT DOCUMENTS

| | | |
|---|---|---|
| EP | 2954474 A2 | 12/2015 |
| EP | 2973322 A1 | 1/2016 |
| WO | 2011/112752 A1 | 9/2011 |
| WO | 2012/106757 A1 | 8/2012 |
| WO | 2012/135115 A2 | 10/2012 |
| WO | 2013/066910 A1 | 5/2013 |
| WO | 2014/062229 A1 | 4/2014 |
| WO | 2014/062230 A1 | 4/2014 |
| WO | 2014/124395 A2 | 8/2014 |
| WO | 2014/124935 A1 | 8/2014 |
| WO | 2014/164228 A1 | 10/2014 |
| WO | 2015/048476 A1 | 4/2015 |

OTHER PUBLICATIONS

PCT International Preliminary Report on Patentability for application PCT/US2013/033145 dated Apr. 21, 2015.

PCT International Preliminary Report on Patentability for application PCT/US2013/033169 dated Apr. 21, 2015.

PCT International Search Report and written Opinion of the Intenational Searching Authority for application PCT/US2014/015630 dated Dec. 8, 2014.

PCT International Search Report and written Opinion of the Intenational Searching Authority for application PCT/US2014/021387 dated Jul. 7, 2014.

PCT International Search report and Written Opinion of the International Seaching Authority for application PCT/US2013/033145 dated Jun. 21, 2013.

PCT International Search Report and Written Opinion of the International Searching Authority for application PCT/US2014/015630 dated Dec. 8, 2014.

PCT International Search Report and Written Opinion of the International Searching Authority for application PCT/US2014/021387 dated Jul. 7, 2014.

PCT International Search Report for application PCT/US2013/033169 dated Jun. 10, 2013.

PCT Written Opinion of the International Searching Authority for application PCT/US2013/033169 dated Jun. 10, 2013.

U.S. Appl. No. 13/794,529, Non-Final Office Action dated Feb. 25, 2015.

U.S. Appl. No. 13/794,529, Non-Final Office Action dated Aug. 6, 2014.

U.S. Appl. No. 13/794,529, Requirement for Restriction/Election dated May 15, 2014.

U.S. Appl. No. 13/797,264 Non-Final Office Action dated Jun. 30, 2015.

U.S. Appl. No. 13/801,520, Final Office Action dated Apr. 15, 2014.

U.S. Appl. No. 13/801,520, Non-Final Office Action dated Jul. 8, 2013.

U.S. Appl. No. 13/801,520, Non-Final Office Action dated Dec. 24, 2014.

U.S. Appl. No. 13/801,610, Non-Final Office Action dated Jul. 12, 2013.

U.S. Appl. No. 13/875,019 Non-Final Office Action dated Jun. 15, 2015.

U.S. Appl. No. 13/875,019, Requirement for Restriction/Election dated Dec. 18, 2014.

U.S. Appl. No. 14/454,695, Non-Final Office Action dated Dec. 29, 2014.

PCT International Search Report and Written Opinion of the International Searching Authority for application PCT/US2013/033145 dated Jun. 21, 2013.

NFC, Security Risks of Near Field Communication, 2017, 1-2, retrieved on Sep. 28, 2021.

Roberts, Paul F., Bluetooth—Sniffing Highway Traffic Monitors Vulnerable to MITM Attack, Dec. 3, 2012, the security ledger, 1-4, https://securityledger.com/2012/12/bluetooth-sniffing-highway-traffic-monitors-vulnerable-to-mitm-attack/, retrieved on Sep. 28, 2021.

Waveform, What causes weak cell phone signal and dropped calls?, 1-3, https://www.waveform.com/pages/causes-of-weak-signal, retrieved on Sep. 28, 2021.

* cited by examiner

CONSUMER DEVICE PAYMENT TOKEN MANAGEMENT

RELATED APPLICATIONS

This application incorporates by reference, each in their entirety, U.S. Provisional Patent Application No. 61/715,229, entitled "Peer-to-Peer Payment Processing," filed Oct. 17, 2012, U.S. Provisional Patent Application No. 61/715,230, entitled "Consumer Presence Based Deal Offers," filed Oct. 17, 2012, and U.S. patent application Ser. No. 13/657,728, entitled "Facilitating Online Transactions," filed Oct. 21, 2012. This application claims priority to and incorporates by reference in its entirety U.S. patent application Ser. No. 13/764,753, filed Feb. 11, 2013.

FIELD

Embodiments of the invention relate, generally, to token management for secure transactions using a consumer device.

BACKGROUND

Financial transactions between merchants and consumers typically require the consumers to present a form of payment to the merchant. As a result, consumers may be required to keep wallets that include payment instruments such as cash, credit cards, debit cards, deal vouchers, coupons, reward tracking cards, checks or the like that may be accepted by merchants and/or their machines or devices used at a point-of-sale (e.g., point-of-sale devices, such as cash registers, credit card readers, etc.). In this regard, areas for improving current systems have been identified. Through applied effort, ingenuity, and innovation, solutions to improve such systems have been realized and are described in connection with embodiments of the present invention.

BRIEF SUMMARY

Systems, methods, and computer readable program code are provided to, in general, improve payment using a device. More specifically, embodiments provided herein may include a payment system that may be implemented to provide merchants (e.g., those that have "brick-and-mortar" retail space and/or online ordering storefronts) a way to receive payment from a consumer based on data sent by a consumer's mobile device and without the consumer having to present a physical payment instrument, identification, or currency directly to the merchant.

Some embodiments may include a payment processing system that includes a networked device, a consumer device, and a plurality of merchant devices including a first merchant device. The networked device may include processing circuitry configured to: generate a plurality of wallet identifying tokens, a plurality of corresponding private keys, and consumer identifying data; send the plurality of wallet identifying tokens and the plurality of corresponding private keys to the consumer device; receive from the consumer device, via a first merchant device of a plurality of merchant devices, a first wallet identifying token; validate the first wallet identifying token based at least in part on whether the first identifying token is one of the plurality of wallet identifying tokens; and send the consumer identifying data associated with the first wallet identifying token to the first merchant device if the first wallet identifying token was validated.

The consumer device may include a display to present interactive displays, communications circuitry configured to facilitate communications with the plurality of merchant devices and the networked device, and processing circuitry. The processing circuitry may be configured to wirelessly receive the plurality of wallet identifying tokens from the networked device and to send the first wallet identifying token to the first merchant device.

The first merchant device may include a display configured to present interactive displays, communications circuitry configured to facilitate communications with the consumer device and the networked device, and processing circuitry. The processing circuitry may be configured to: wirelessly receive the first wallet identifying token from the consumer device; send the first wallet identifying token to the networked device; and receive the consumer identifying data from the networked device.

In some embodiments, the processing circuitry of the networked device may be further configured to: validate the first wallet identifying token based at least in part on whether the first wallet identifying token was received from the first merchant device during a payment period for the first wallet identifying token; and send the consumer identifying data associated with the second wallet identifying token to the first merchant device if the second wallet identifying token was validated.

The processing circuitry of the consumer device may be further configured to: initiate the payment period for the first wallet identifying token; monitor the payment period for the first wallet identifying token; initiate a second payment period for a second wallet identifying token when the payment period has lapsed; and wirelessly send the second wallet identifying token of the plurality of wallet identifying tokens to the first merchant device when the payment period has lapsed.

In some embodiments, the payment processing system may further include a second merchant device of the plurality of merchant device. The processing circuitry of the networked device may be further configured to validate the second wallet identifying token based at least in part on whether the second wallet identifying token was received from the second merchant device during the second payment period for the second wallet identifying token. The processing circuitry of the consumer device may be further configured to wirelessly send the second wallet identifying token to the second merchant device when the payment period for the first wallet identifying token has lapsed.

In some embodiments, the processing circuitry of the consumer device may be further configured to: remove the first wallet identifying from a reserve of wallet identifying tokens after initiating the payment period for the first wallet identifying token; and receive one or more additional wallet identifying tokens from the networked device sufficient to maintain the reserve of wallet identifying tokens at the consumer device.

In some embodiments, the processing circuitry of the networked device may be further configured to: validate the first wallet identifying token based at least in part on whether the first wallet identifying token was received from the first merchant device during a redemption period for the first wallet identifying token; receive, from the first merchant device, secured payment approval data that comprises consumer approval data signed with a first private key of the plurality of corresponding private keys, wherein the first private key is associated with the first wallet identifying token; determine the first private key associated with the first wallet identifying token; generate payment approval data if the first wallet identifying token was validated by validating the secured payment approval data with the first private key; and facilitate a financial transaction based on the payment approval data.

The processing circuitry of the consumer device may be further configured to: wirelessly receive transaction data from the first merchant device; generate the consumer approval data for the transaction data by signing the transaction data with the first private key; and wirelessly send the consumer approval data to the first merchant device.

The processing circuitry of the first merchant device may be further configured to: wirelessly receive the consumer approval data from the consumer device; generate the secured payment approval data based on the consumer approval data; and send the secured payment approval data to the payment processing system before the redemption period for the first wallet identifying token has lapsed. In some embodiments, the processing circuitry of the consumer device may be further configured to generate consumer approval data for the transaction data by creating a one-way hash with the signed transaction data.

Some embodiments may provide for a payment processing system that includes a networked device. The networked device may include processing circuitry configured to: generate a plurality of wallet identifying tokens, each wallet identifying token associated with a private key and consumer identifying data; send the plurality of wallet identifying tokens to a consumer device; receive from the consumer device, via a merchant device, a first wallet identifying token; validate the first wallet identifying token based at least in part on whether the first identifying token is one of the plurality of wallet identifying tokens; and send the consumer identifying data associated with the first wallet identifying token to the merchant device if the first wallet identifying token was validated.

In some embodiments, the processing circuitry of the networked device may be further configured to validate the first wallet identifying token based at least in part on whether the first wallet identifying token was received from the merchant device during a payment period for the first wallet identifying token. In various embodiments, the payment period may be initiated by the consumer device or networked device. The payment period may also be 12 hours.

In some embodiments, the processing circuitry of the networked device may be further configured to: receive from the consumer device, via a second merchant device, the first wallet identifying token; validate the first wallet identifying token based at least in part on whether the first identifying token was received from the second merchant device during the payment period; and send the consumer identifying data associated with the first wallet identifying token to the second merchant device if the first wallet identifying token was validated.

In some embodiments, the processing circuitry of the networked device may be further configured to: receive, from merchant device, secured payment approval data that comprises consumer approval data signed with a first private key associated with the first wallet identifying token; determine the first private key associated with the first wallet identifying token; validate the secured payment approval data with the first private key; and facilitate a financial transaction based on the secured payment approval data. In some embodiments, consumer approval data may include a one-way hash of transaction data signed with the first private key.

In some embodiments, the processing circuitry of the networked device may be further configured to validate the secured payment approval data based at least in part on whether the secured payment approval data was received from the merchant device during a redemption period for the first wallet identifying token. For example, the redemption period may be 24 hours and may be initiated by the consumer device.

In some embodiments, the processing circuitry of the networked device may be further configured to send one or more additional wallet identifying tokens to the consumer device sufficient to maintain a reserve of wallet identifying tokens at the consumer device. For example, the reserve of wallet identifying tokens may be 20.

Some embodiments may provide for a consumer device that includes a display configured to present interactive displays, communications circuitry configured to facilitate communications with one or more merchant devices and a payment processing system, and processing circuitry. The processing circuitry may be configured to: receive a plurality of wallet identifying tokens from the payment processing system, each wallet identifying token associated with a private key and consumer identifying data; wirelessly send a first wallet identifying token of the plurality of wallet identifying tokens to a merchant device of the one or more of merchant devices; monitor a payment period for the first wallet identifying token; and wirelessly send a second wallet identifying token of the plurality of wallet identifying tokens to the merchant device after the payment period has lapsed.

In various embodiments, the processing circuitry of the consumer device may be further configured to initiate the payment period. The processing circuitry may be configured to timestamp the first wallet identifying token before wirelessly sending the first wallet identifying token to the merchant device, wherein the payment period is initiated based on the timestamp. The processing circuitry may be configured to receive a payment period indication from the payment processing system for initiating the payment period. The processing circuitry may be configured to receive a first payment period indication from the payment processing system for initiating the payment period and a second payment period indication from the payment processing system for determining lapse of the payment period.

In various embodiments, the processing circuitry of the consumer device may be configured to initiate a second payment period for the second wallet identifying token following lapse of the payment period. The processing circuitry may be configured to timestamp the second wallet identifying token before wirelessly sending the second wallet identifying token to the merchant device, wherein the second payment period is initiated based on the timestamp. The processing circuitry may be configured to receive a payment period indication from the payment processing system for initiating the second payment period. The processing circuitry may be configured to receive a first payment period indication from the payment processing system for initiating the second payment period and a second payment period indication from the payment processing system for determining lapse of the second payment period.

In some embodiments, the processing circuitry of the consumer device may be further configured to: wirelessly send the second wallet identifying token to a second merchant device of the one or more merchant devices after the payment period for the first wallet identifying token has lapsed; and wirelessly send the first wallet identifying token of the plurality of wallet identifying tokens to the second merchant device before the payment period for the first wallet identifying token has lapsed. For example, the payment period may be 12 hours.

In some embodiments, the processing circuitry of the consumer device may be further configured to: wirelessly receive transaction data from the merchant device; generate consumer approval data for the transaction data by signing the transaction data with a first private key associated with the first wallet identifying token, wherein the consumer approval data is valid for facilitating a financial transaction at the payment processing system for a redemption period; and wirelessly send the consumer approval data to the merchant device. For example, the redemption period may be 24 hours. In some embodiments, the processing circuitry may be further configured to generate consumer approval data for the transaction data by creating a one-way hash with the signed transaction data.

In some embodiments, the processing circuitry of the consumer device may be further configured to receive one or more additional wallet identifying tokens from the payment processing system sufficient to maintain a reserve of wallet identifying tokens at the consumer device. For example, the reserve of wallet identifying tokens may be 20.

Some embodiments may provide for a merchant device. The merchant device may include a display configured to present interactive displays, communications circuitry configured to facilitate communications with a consumer device and a payment processing system, and processing circuitry. The processing circuitry may be configured to: wirelessly receive a first wallet identifying token from the consumer device, the first wallet identifying token associated with consumer identifying data; send the first wallet identifying token to the payment processing system; receive the consumer identifying data from the payment processing system; and wirelessly receive a second wallet identifying token from the consumer device after a payment period for the first wallet identifying token has lapsed.

In some embodiments, the processing circuitry of the merchant device may be further configured to: wirelessly send transaction data to the consumer device; wirelessly receive, from the consumer device, consumer approval data for at least the transaction data signed with a first private key associated with the first wallet identifying token; generate secured payment approval data based on the consumer approval data; and send the secured payment approval data to the payment processing system before a redemption period for the first wallet identifying token has lapsed.

In some embodiments, the processing circuitry of the merchant device may be further configured to: wirelessly send transaction data to the consumer device; wirelessly receive, from the consumer device, consumer approval data for at least the transaction data signed with a first private key associated with the first wallet identifying token; generate secured payment approval data based on the consumer approval data; and send the secured payment approval data to the payment processing system before a redemption period for the first wallet identifying token has lapsed. For example, the consumer approval data may include a one-way hash of the transaction data signed with the first private key. In some embodiments, the processing circuitry of the merchant device may be further configured to monitor the redemption period for the first wallet identifying token.

Some embodiments may include one or more machines, such as an apparatus and/or system, configured to implement the methods and/or other functionality discussed herein. For example, the machine may include one or more processors and/or other machine components configured to implement the functionality discussed herein based on instructions and/or other data stored in memory and/or other non-transitory computer readable media.

These characteristics as well as additional features, functions, and details of various corresponding and additional embodiments are also described below.

BRIEF DESCRIPTION OF THE DRAWINGS

Figure 1A:
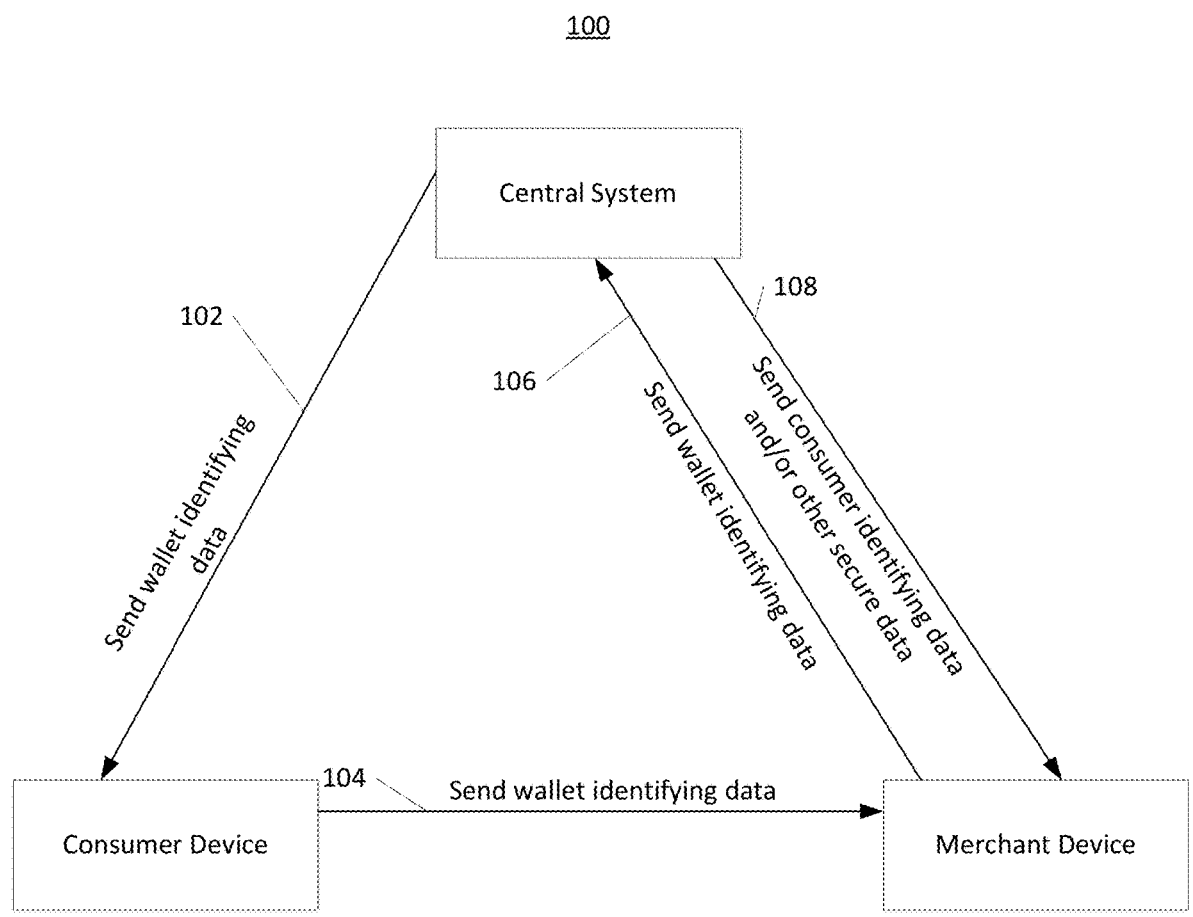
Figure 1B:
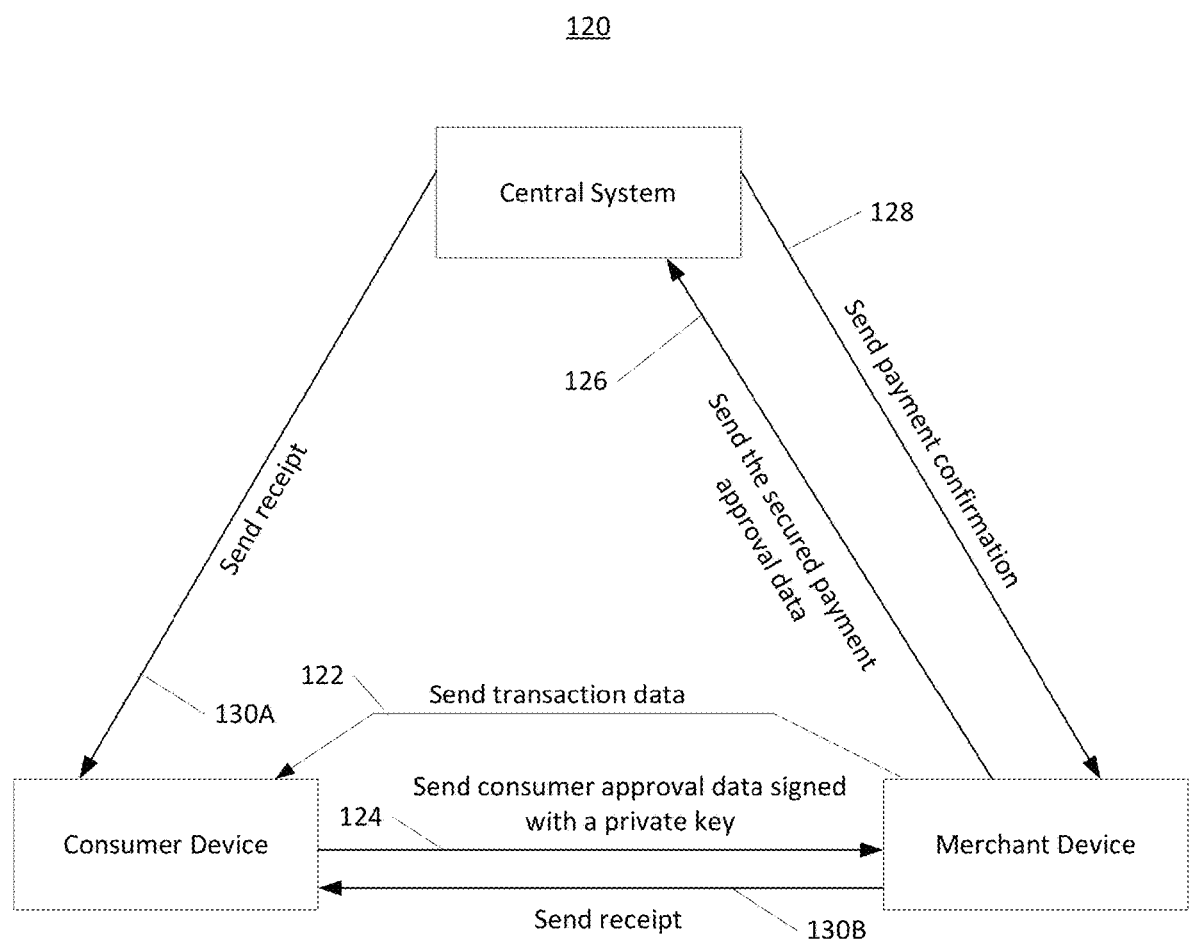
Figure 2A:
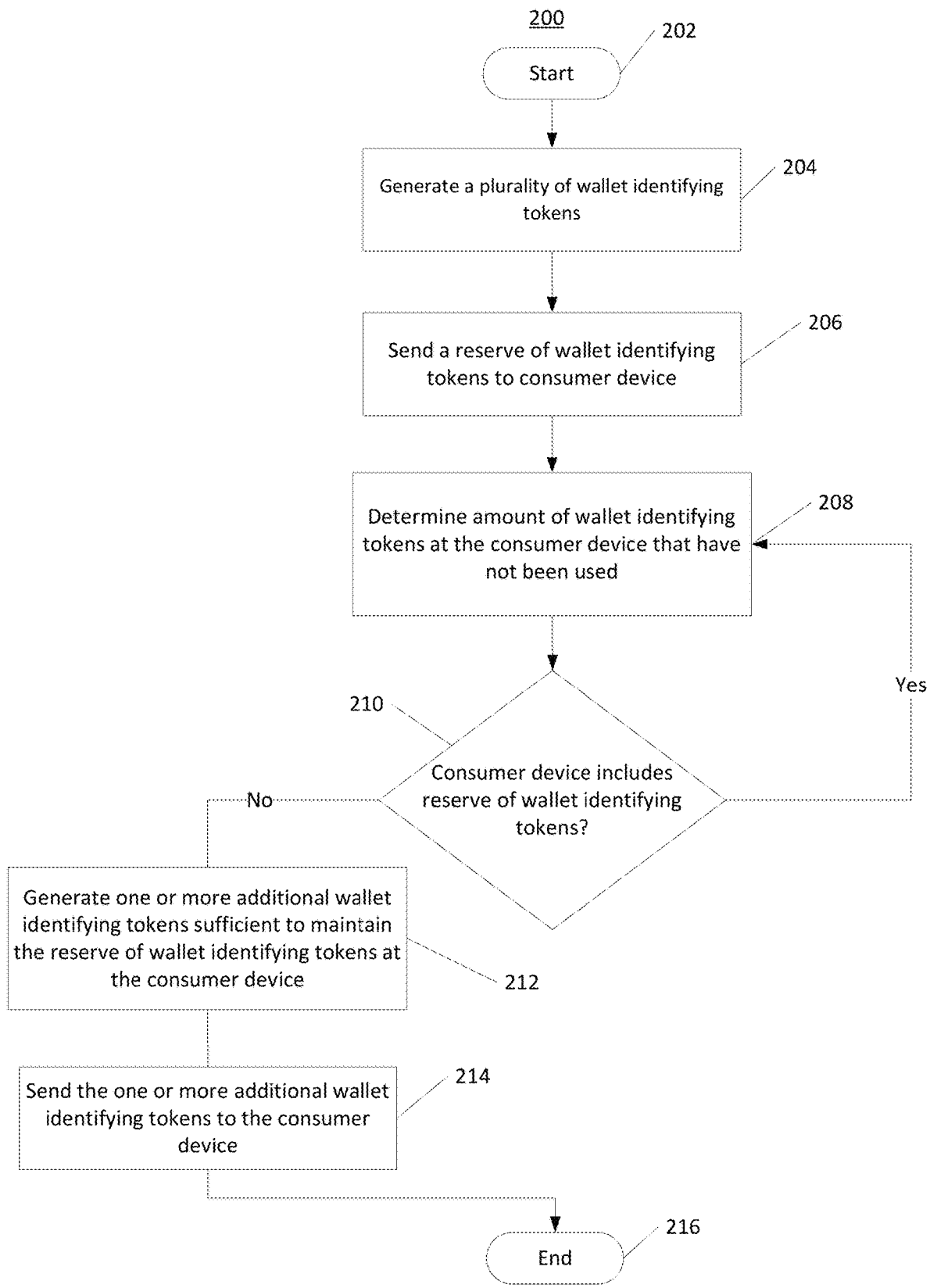
Figure 2B:
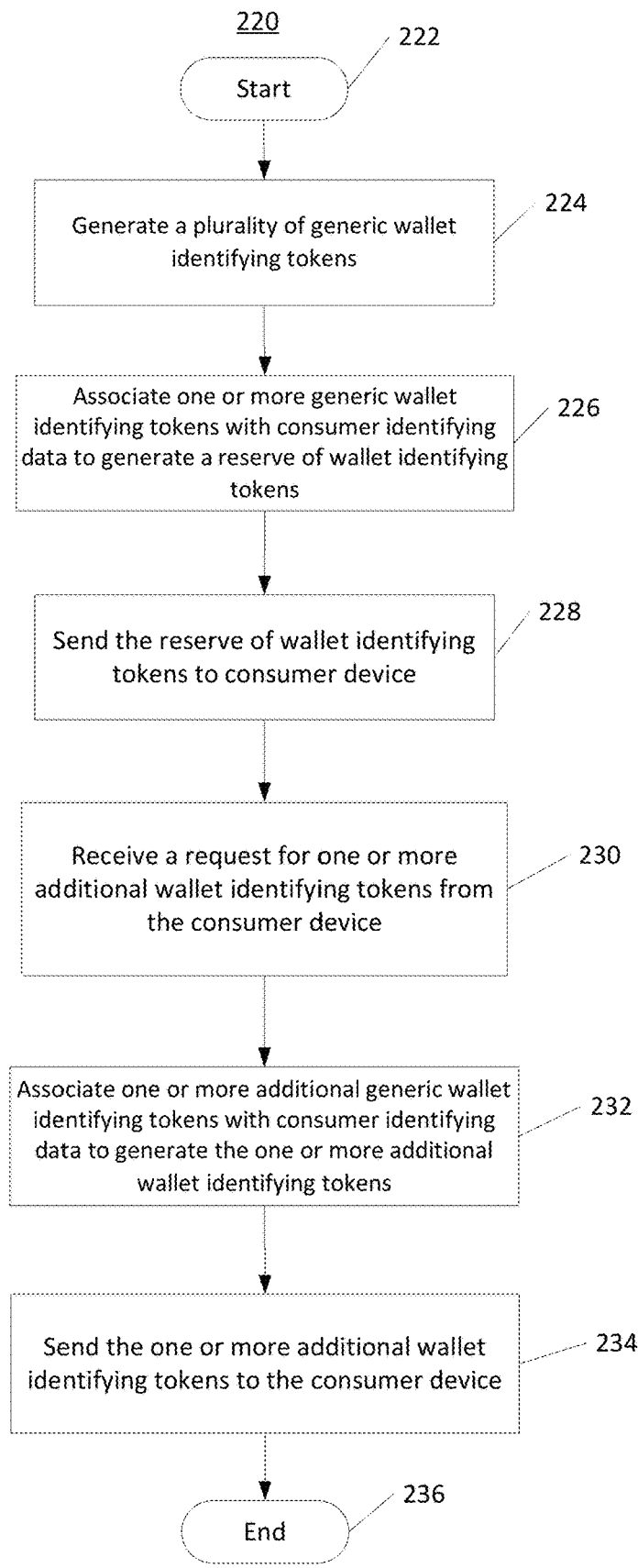
Figure 2C:
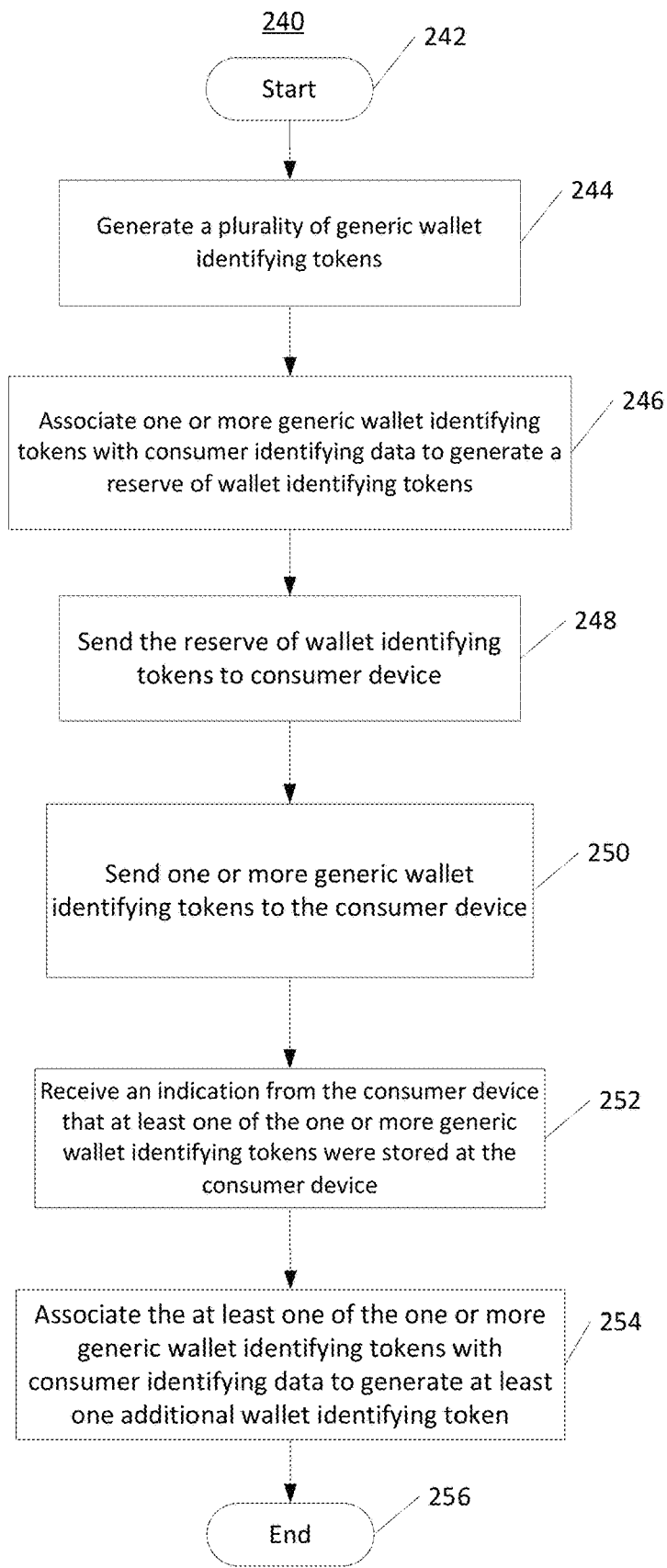
Figure 3:
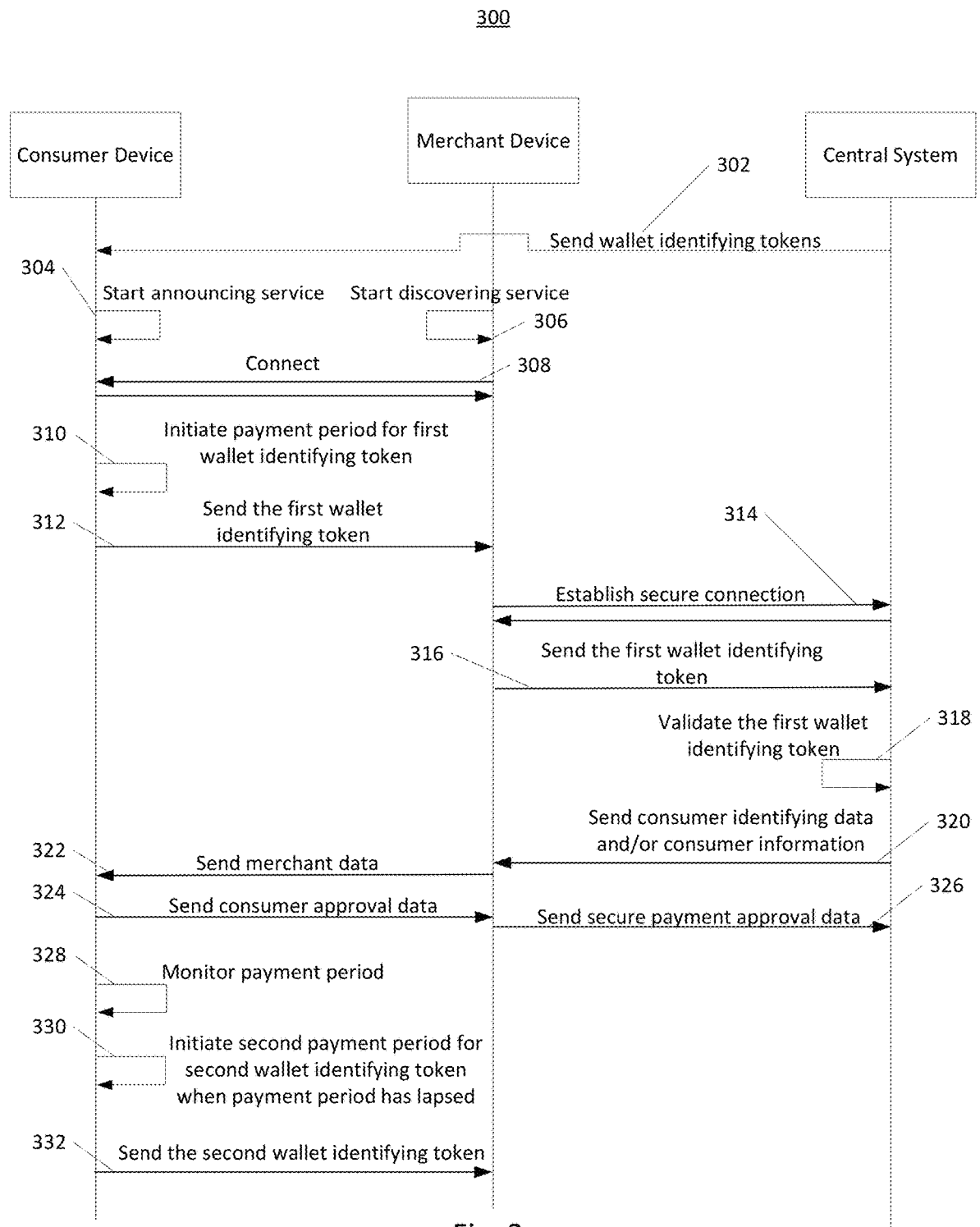
Figure 4:
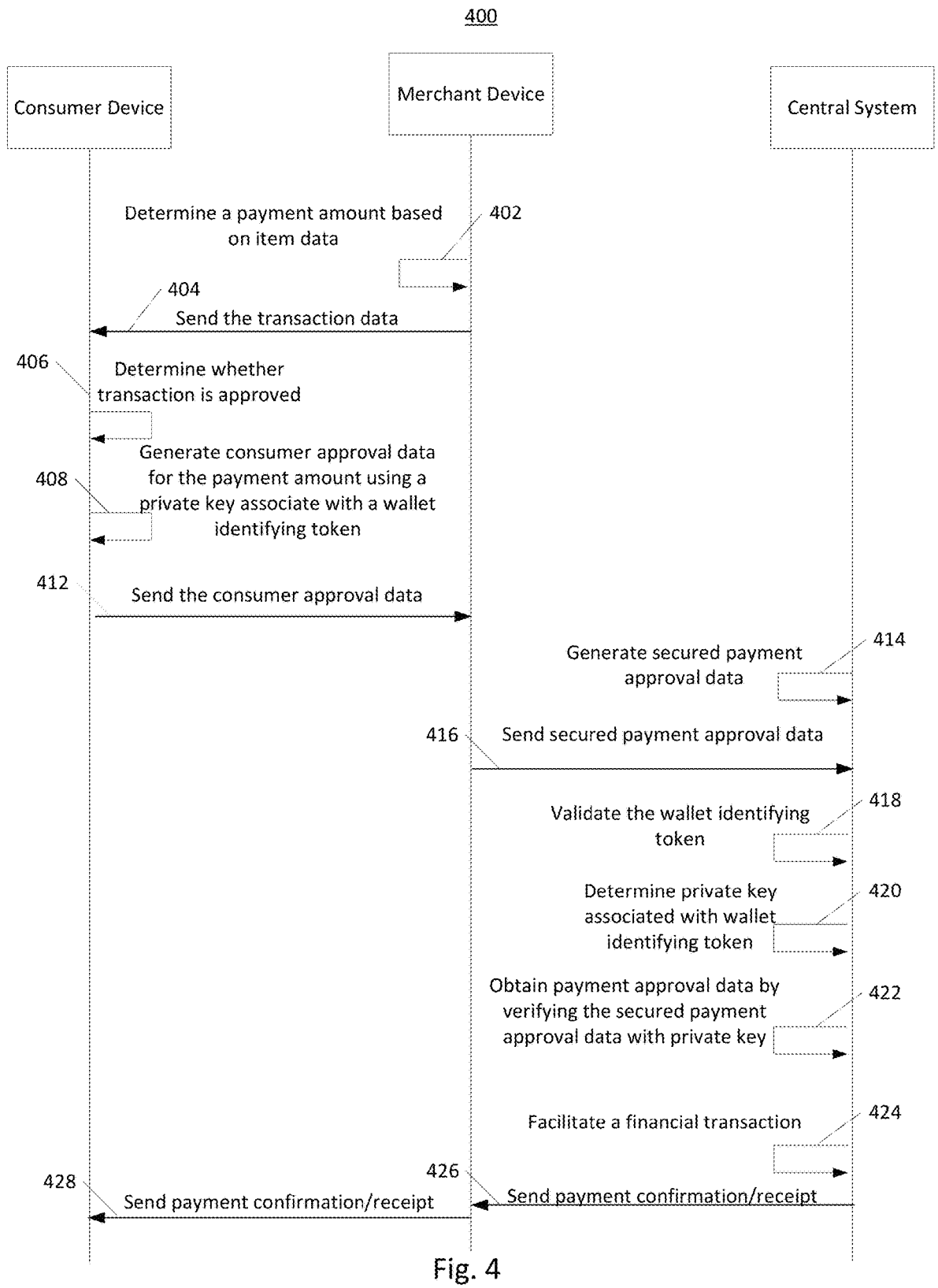
Figure 5:
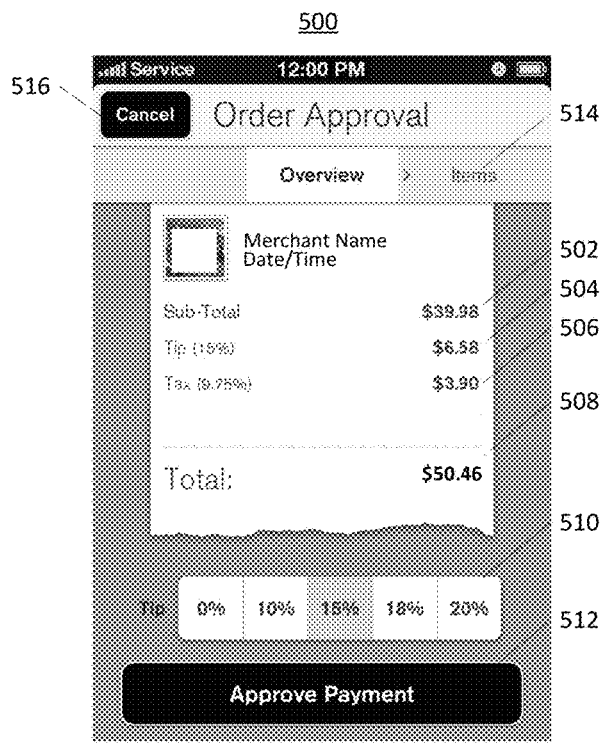
Figure 6:
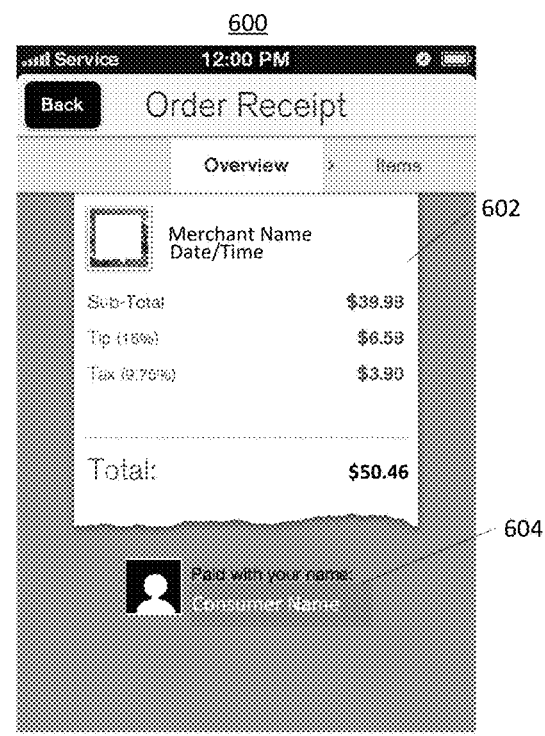
Figure 7:
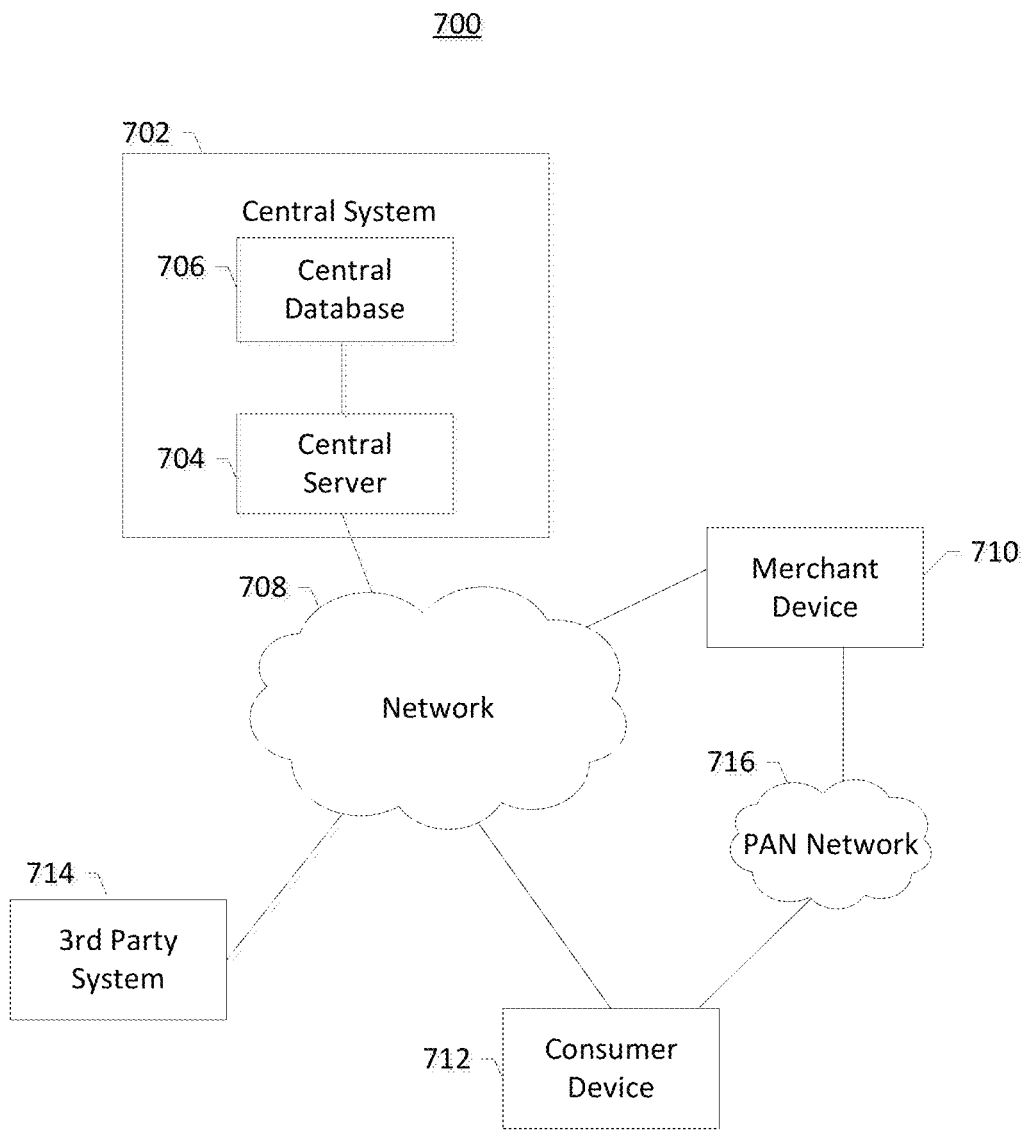
Figure 8:
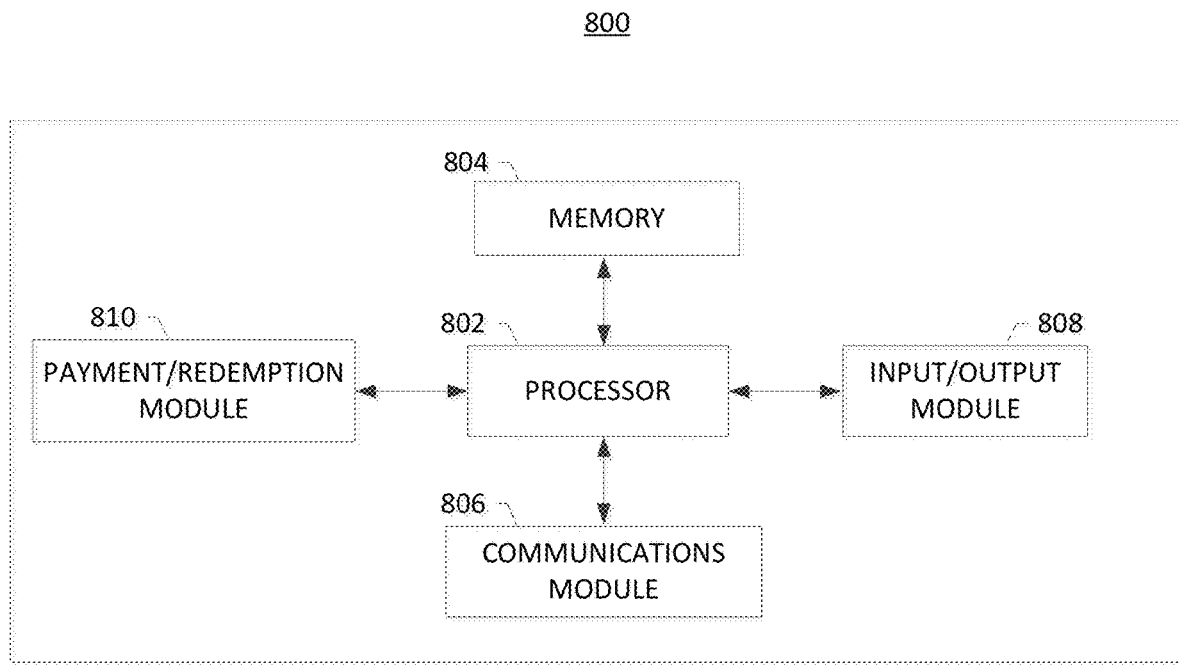

Having thus described some embodiments in general terms, reference will now be made to the accompanying drawings, which are not necessarily drawn to scale, and wherein:

FIG. 1a shows a flow chart of an example method for determining the presence of a consumer, performed in accordance with some embodiments;

FIG. 1b shows a flow chart of an example method for facilitating a financial transaction, performed in accordance with some embodiments;

FIG. 2a shows a flow chart of an example method which can result in wallet identifying tokens being sent to a consumer device from a central system, performed in accordance with some embodiments;

FIG. 2b shows a flow chart of an example method which can result in wallet identifying tokens being sent to a consumer device from a central system, performed in accordance with some embodiments;

FIG. 2c shows a flow chart of an example method which can result in wallet identifying tokens being sent to a consumer device from a central system, performed in accordance with some embodiments;

FIG. 3 shows an example of a data flow of a method for establishing a connection with between a consumer device and one or more merchant devices based on payment periods for wallet identifying tokens, performed in accordance with some embodiments;

FIG. 4 shows an example of a data flow of a method for facilitating a payment based on a redemption period for a wallet identifying token, performed in accordance with some embodiments;

FIGS. 5 and 6 show example graphical user interface displays that may be presented by various components of systems, in accordance with some embodiments;

FIG. 7 shows an example system for wallet identifying token management, configured in accordance with some embodiments; and FIG. 8 shows an example schematic block diagram of circuitry, configured in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

Embodiments discussed herein may be configured to provide techniques for securing and/or otherwise verify consumer identification and payments using a consumer device that interfaces with merchant devices. For example, a consumer may carry a consumer device as the consumer walks into a merchant's shop. The consumer device may be configured to interface with a merchant device, such by establishing a wireless connection with the merchant device. Through this interface the consumer may be automatically identified by the merchant device. However, rather than passing private consumer data via the wireless connection, the consumer device may be configured to send a wallet identifying token to the merchant device. As discussed in greater detail herein, the wallet identifying token reveals little or no useful information to unauthorized devices. The merchant device sends the wallet identifying token to a central system (e.g., a payments processing network), such as via a secure connection and, once the wallet identifying token is validated, the merchant device receives consumer information in return.

The wallet identifying token and/or an associated private key may be used to secure or otherwise verify payment approval data. In this regard, some embodiments may free a consumer from having to carry traditional physical payment instruments such as credit cards, currency, checks, and/or other items typically stored in a physical wallet. For example, when the consumer is ready to make a payment at a merchant location, the consumer device may be configured to use the wallet identifying token and/or associated private key to sign (e.g., create an electronic signature or the like) the payment approval data (including transaction data) to form consumer approval data. The merchant device may generate a secured payment approval data upon receipt of the consumer approval data. As discussed in greater detail herein, this "secured payment approval data" reveals little or no useful information to unauthorized devices who might intercept this signal. The merchant device may then send the secured payment approval data to the central system for processing of a financial transaction between the consumer and merchant.

Various embodiments discussed herein provide for the secure issuance and management of wallet identifying tokens. For example, upon use of a wallet identifying token, a limited payment period and/or redemption period for the wallet identifying token may begin to run. Upon lapse of the payment period, the consumer device may be configured to begin using a second wallet identifying token for consumer identification and payments. Upon lapse of the redemption period, the central system will no longer accept payment approval data secured with the lapsed wallet identifying token (e.g., from a merchant device).

The payment period and/or redemption period may be set to be shorter than a time in which a wallet identifying token could be cracked, deciphered, decrypted, reverse engineered or otherwise made suitable for unauthorized use. In some embodiments, the redemption period may be longer than the payment period to give merchants a form of grace period to redeem received payments from the consumer device. An example payment period may be 12 hours while an example redemption period may be 24 hours.

One advantage that may be realized by some embodiments discussed herein is that the consumer device can be configured to facilitate a secure network-based payment with the merchant device without an active connection with the central system (e.g., via the Internet) at the time of the transaction, such as by using the wireless connection or other unsecure direct connection with a merchant device (e.g., a merchant POS device). For example, consumer devices may have poor Internet connectivity (e.g., via mobile broadband) at a merchant facility or other geographic location. In one embodiment, the central system may be configured to mitigate the risk of poor connectivity by generating and sending multiple wallet identifying tokens to the consumer device in a single session to maintain a reserve of wallet identifying tokens at the consumer device that may be used (e.g., at multiple merchants and/or over extended periods of time) during periods of poor connectivity without having to reestablish a connection with the central system.

Some other, but non-exhaustive, advantages that may be realized by some embodiments discussed herein include: allowing a merchant to ensure that a user of a consumer device is in fact the individual authorized to make payments using the consumer device, allowing payments between two peer devices (e.g., two mobile phones), and/or providing promotional offers (e.g., promotional deal offers, promotional deal redemptions, sales, discounts, rewards, or the like) for ready acceptance and redemption using a consumer device.

Consumer Presence Detection Overview

FIG. 1a shows a flow chart of an example method 100 for determining the presence of a consumer, performed in accordance with some embodiments. Method 100 is meant to show a high level example, while some of the other processes flows and other drawings discussed herein show more detailed examples. While other embodiments may operate differently, the examples discussed herein are largely focused on detecting the consumer's presence (e.g., location within an identified environment such as, for example, a retail store) based on a consumer device being in communicable range with a merchant device. In one embodiment, the consumer device and the merchant device are each configured to wirelessly communicate or interface with one another. For example, the consumer device and the merchant device may be running a Bluetooth-compliant protocol, such as Bluetooth v4, and/or be may be configured to establish/join any other type of public access network (PAN).

At 102, a central system may be configured to send wallet identifying data to a consumer device. The term "central system" as used herein refers to any marketing system, payment processing system, coupon provider system, and/or any other type of promotional system controlled by a merchant, third party and/or any other type of user (e.g., such as hardware provider, software application developer, online retailer, brick-and-mortar retailer, etc.). The central system may be accessible via one or more computing devices and may be operable to provide example promotion and/or marketing services on behalf of one or more providers that are offering one or more vouchers that are redeemable for goods, services, experiences and/or the like. The central system may be further configured to illustrate or otherwise inform one or more consumers of the availability of one or more vouchers (e.g., deals) in the form of one or more offers. In some examples, the central system may also take the form of a redemption authority or payment processor, it may provide rewards indications and/or it may function as an entity within a financial network. As such, the central system is, in some example embodiments, configured to present one or more offers, accept payments for offers from both merchants and consumers, upon acceptance of an offer, issue vouchers, indicate whether a voucher is valid for the purpose of redemption, generate rewards, provide a point of sale device or otherwise participate in the exchange of goods, services or experiences for currency and/or the like. In some embodiments discussed herein, the central system is referred to as a networked device.

The wallet identifying data may comprise, for example, one or more keys, random numbers, codes, and/or other types of tokens. As used herein, the term "random" includes pseudorandom or computationally generated numbers, keys, tokens, and the like. The wallet identifying data may be configured to be usable for identifying a particular consumer, a particular consumer device of the consumer, and/or a consumer payment account of the consumer configured to make payments.

The wallet identifying data may be used to encode and/or otherwise secure messages, or simply function as random data that has no meaning without having secure access to the central system and more particularly to a private key. Private information such as consumer identifying data, merchant data, financial data, transaction data, and/or other sensitive, non-random data may be secured and/or otherwise represented by the wallet identifying data, such that the wallet identifying data can be broadcast publically (e.g., over an unsecured PAN) while mitigating the risk that non-authorized users and/or devices might obtain sensitive financial information about the consumer, merchant, transaction, etc. For example, the wallet identifying data may be random data associated with the more sensitive, less random data, and the wallet identifying data can be transmitted over at least some types of communication links (e.g., unsecured or less secured wireless networks or direct connections) instead of the more sensitive, less random data.

In some embodiments, the consumer device may be configured to broadcast the wallet identifying data it receives from the central system at 102 at some and/or all times. For example, whenever the consumer device is running a corresponding software application or otherwise set to broadcast (e.g., as the application runs in the background of the consumer device's operating system), the consumer device can be configured to broadcast and/or otherwise send the wallet identifying data at 104. As discussed above, the link between consumer device and the merchant device used to send the wallet identifying data can be an unsecure connection (such as a Bluetooth connection, public WiFi connection, near field communication connection, etc.) without unduly raising consumer privacy risks. Nonetheless, some embodiments may utilize a secure connection between the consumer device and the merchant device (e.g., Wired Equivalent Privacy (WEP), Wi-Fi Protected Access (WIPA), Wi-Fi protected Access version 2 (WPA2), etc.).

In some embodiments, the merchant device will only receive the wallet identifying data from the consumer device at 104 when the consumer device is in communicable proximity (e.g., within Bluetooth broadcast range) with the merchant device. Hence, when the merchant device receives the wallet identifying data from the consumer device, the merchant device and/or the central system can be configured to determine that the consumer device is physically located proximate the merchant device. For example, in one embodiment, the consumer may walk into a merchant shop while carrying the consumer device with an application running that causes the consumer device to broadcast the wallet identifying data. The consumer device may be configured to connect or pair with one or more merchant devices at 104, such as via a PAN (e.g., using Bluetooth) when the consumer device comes within a communicable range to the merchant device.

In some embodiments, the consumer device and the merchant device may communicate via the newly established connection or PAN and/or perform payment transactions without requiring that the consumer device have an active connection to the central system or some other payment processing system (e.g., via the Internet). The connection between the consumer device and the central system at 102 is not required to be active or otherwise available at 104. For example, mobile broadband connections between the consumer device and the Internet may become unavailable as the consumer device enters certain indoor merchant facilities and/or remote geographic locations.

When the merchant device establishes its own connection to the central system, which in some embodiments may be permanent or episodic, the merchant device may be configured to send the wallet identifying data to the central system at 106. In some embodiments, the merchant device and the central system may share a relatively secure connection when compared to that between the consumer device and the merchant device. In still other embodiments, a dedicated secure connection between the merchant device and the central system may be maintained.

At 108, the central system may be configured to send consumer identifying data (e.g., image data, consumer name, consumer account information) and/or any other type of consumer information (e.g., consumer preference data, consumer history data (e.g., indicating prior interaction with particular employees), purchase history, promotional deals, promotional vouchers of the merchant available for purchase by the consumer, promotional vouchers redeemable at the merchant, or any other preference related information) to the merchant device. As discussed below, this information can be based on data uploaded directly from the consumer's device(s) to the central system and/or collected based on the consumer's interactions (e.g., either via the consumer device or some other device), with the merchant device and/or other devices such as with a promotional system, third party system and/or separate payment processing system. Method 100 may then end.

As will be apparent to one of ordinate skill in the art in view of this disclosure, the above described method allows for consumer identifying data and/or other secure information to be received at a merchant device upon a consumer device coming within communication proximity to the merchant device. In this embodiment, the consumer identifying data is not transmitted from the consumer device directly to the merchant device via the relatively unsecure PAN connection to avoid its being intercepted and improperly used.

As discussed below in greater detail, some embodiments may provide for techniques for issuing and managing one type of wallet identifying data, which are referred to herein as "wallet identifying tokens." Referring again to FIG. 1*a*, the central system may be configured to send wallet identifying tokens to the consumer device at 102. In circumstances where a consumer intends to transact with a merchant, a wallet identifying token may be sent to the merchant device at 104. The wallet identifying token may be sent from the merchant device to the central system at 106. The central system may then validate the wallet identifying token, using techniques discussed below, before sending consumer identifying data to the merchant device at 108. This consumer identifying data may be interpreted by the merchant device to identify and authenticate the consumer in anticipation of executing a proposed transaction.

A payment period for a wallet identifying token may then be initiated within which the wallet identifying token may be used to execute the merchant transaction (e.g., make a payment). In some embodiments, as discussed in greater detail below, expiration of the payment period for a first wallet identifying token requires the transaction to be executed using a second wallet identifying token. In still other embodiments, a redemption period may be initiated within which the merchant device may use payment approval data, that comprises consumer approval data signed with the wallet identifying token (or corresponding private key), for executing a transaction with the central system. The limited lifetime of the wallet identifying token may provide enhanced security from any unauthorized devices that may intercept the wallet identifying token (e.g., via its transmission from the consumer device to the merchant device at 104).

Also as discussed below in greater detail, some embodiments may be configured to maintain a reserve of wallet identifying tokens at the consumer device. For example, as wallet identifying tokens are used, they may be removed from the reserve of wallet identifying tokens at the consumer device. The central system may be configured to send one or more additional wallet identifying tokens to the consumer device to maintain the reserve. As such, the consumer device may be configured to use the reserve of wallet identifying tokens at multiple merchants, and/or over extended periods of time, without requiring any active connection to the central system (e.g., until all of the reserve of wallet identifying tokens are used).

Consumer Payment Transaction Overview

FIG. 1*b* shows a flow chart of an example method 120 for facilitating a financial transaction between the consumer and the merchant, performed in accordance with some embodiments. Method 120 is meant to show a high level example, while some of the other processes flows discussed herein show more detailed examples. In some embodiments, the wallet identifying data may be further associated with and/or configured to be usable for identifying a consumer payment account. The consumer payment account may be used to make payments, such as to a merchant account, an employee account, and/or any other type of suitable account configured to receive payments. While method 120 is described herein as being directed to payments from consumer to merchant, the consumer device and/or consumer payment account may also be configured to receive payments in some embodiments. In some embodiments, method 120 may be performed whenever a consumer customarily provides payment to a merchant, such as upon the completion of a meal or after the ordering of menu items at a restaurant or upon selecting items for purchase at a retail store.

At 122, the merchant device may be configured to send transaction data to the consumer device. In one embodiment, the transaction data may include a transaction ID (a unique number or code generated by the point-of-sale device for each transaction), a merchant ID (a unique number or code associated with each merchant), a payment amount and/or the like. In another example embodiment, the transaction data may include the merchant ID and the payment amount. The payment amount may be determined from item data indicating one or more items selected for purchase by the consumer. The item data may further include price data for the one or more items. In some embodiments, the item data may be generated by the merchant device (e.g., via merchant input) and/or from one or more input devices coupled thereto (e.g., a barcode scanner, magnetic stripe reader, user keypad, touchscreen display, RFID reader, etc.). As such, the merchant device may be configured to receive the item data, determine the transaction data based on the item data, and send the transaction data to the consumer device at 122. Additionally and/or alternatively, the consumer device may be configured to perform one or more of the functions related to generating the transaction data (e.g., item selection and/or input via consumer device). In still other embodiments, the merchant device may send the item data (e.g., a UPC code) to a server or host to retrieve from the server or host the transaction data (including a payment amount and other product or service data). Alternatively or additionally, the transaction data may include a field or other property that is indicative that a tip or other modification of the payment amount is authorized in a transaction. In some embodiments, the transaction data may further include the item data (e.g., to indicate to the consumer the items that accounted for the payment amount.)

At 124, the consumer device may be configured to send consumer approval data indicating approval of the proposed transaction (e.g., that which is embodied by the transaction data). As discussed below in greater detail, in some embodiments, the consumer device may be further configured to use a wallet identifying token or a private key associated with the wallet identifying token to sign the consumer approval data. In one embodiment, this consumer approval data may consist of an electronic signature created by appending a private key associated with the wallet identifying token to a data string representing the transaction data and then performing an algorithmic transformation, such as a one way hash of the private key appended data string. In some embodiments, the wallet identifying token used at 124 may be the same as the wallet identifying token sent to the merchant device at 104 of method 100. The communication between the consumer device and the merchant device, as well as any and/or all direct communications between the consumer device and the merchant device, may use the PAN connection established at 104 of method 100. Alternatively or additionally, the consumer device may be configured to encrypt the transaction data and the consumer approval data using the private key.

At 126, the merchant device may be configured to generate secured payment approval data based on the consumer approval data and the transaction data. The merchant device may then be configured to send the secured payment approval data to the central system. The central system may use this information to determine whether to execute a payment by the consumer to the merchant. In some embodiments, the central system may be configured to validate or otherwise authenticate the secured payment approval data received from the merchant device. For example, the central system may be configured to validate and/or otherwise authenticate the secured payment approval data based on the wallet identifying token or associated private key (e.g., as sent to the consumer device at 102 of method 100 and later received from the merchant device). Alternatively or additionally, the central service may be configured to decrypt the transaction data and the consumer approval data using the private key in example embodiments in which the consumer device and/or the merchant device caused the consumer approval data, the secured payment approval data or the like to become encrypted.

If the central system validates the secured payment approval data, then a payment confirmation may be sent to the merchant device at 128. In some embodiments, a transaction receipt (e.g., information about the particular transaction) and/or other receipt information may be sent to the consumer device from the central system at 130A. The other receipt information can include, for example, a remaining balance and/or purchase power after the instant transaction (e.g., the amount of money until the consumer payment account reaches the applicable credit limit(s), the amount of money remaining in the consumer payment account after the transaction is processed, etc.), total spent over a given period of time (e.g., the amount of money spent in an hour, day, week, etc. including the instant transaction), total spent at a given merchant and/or location (e.g., amount of money spent at the merchant over a period of time, amount of money spent in a city over a period of time, etc.), and/or any other purchase-related information that may be of interest to the consumer subsequent to a transaction (including information that may help identify fraud and/or improper use of the consumer payment account).

In addition to or instead of the receipt being sent from the central system to the consumer device at 130A, a transaction receipt and/or other receipt information may be sent to the consumer device from the merchant device at 130B. The receipt information sent from the merchant device can be the same as or different than that sent at 130A, and/or can be independent of or based on receipt information generated by the central system. For example, the merchant device can be configured to send an independent receipt to the consumer device that the consumer can use to verify the receipt information sent from the central system at 130A. This may aid the consumer in confirming that the central system actually charged the payment amount (and/or help the consumer identify a discrepancy between the expected charge and the amount actually charged). As another example, the central system may also or instead send receipt information to the merchant device, which may then send the receipt to the consumer device.

Wallet Identifying Token Creation

FIG. 2a shows a flow chart of an example data flow represented by method 200, which can result in wallet identifying tokens being sent to a consumer device from a central system, performed in accordance with some embodiments. As will be apparent to one of ordinary skill in the art in view of this disclosure, method 200 may be performed after a consumer and/or a consumer device has become registered with (i.e., created a consumer payment account, checking account, credit card account, line of credit, loyalty account, etc.) the central system.

Method 200 may begin at 202 and proceed to 204, where the central system may be configured to generate a plurality of wallet identifying tokens. "Wallet identifying tokens" or "wallet identifying data," as used herein, may refer to any type of data that may be used to secure data transfers between the consumer device and the merchant device and enable the consumer device to cause the merchant device to receive secure information about the consumer (and/or the consumer's payment account) from the central system. For example, a wallet identifying token may include, or may be based at least partially on, a random or pseudorandom code, number, etc., generated by the central system. In various embodiments, the central system may be configured to associate the wallet identifying token with consumer identifying data that identifies a consumer, a consumer device and/or a consumer payment account. This association may be stored to a memory or database that is accessible by the central system.

In some embodiments, the wallet identifying token may be associated with a private key. For example, the wallet identifying token may be configured to be usable as a public key that may be passed to other devices (e.g., a consumer device, a merchant device, a central system, etc.) to validate or authenticate various types of data. The private key may be used by the central system to correlate a wallet identifying token with consumer identifying data and to validate and/or otherwise verify secured payment approval data such that the data may be relied upon as authentic and, thus, processed or otherwise used. The private key may be kept secret by the central system and/or securely shared with only devices (e.g., consumer devices) authorized to use wallet identifying tokens and private keys as discussed in greater detail herein. In some embodiments, a wallet identifying token and a corresponding private key may be generated together and/or mathematically related such that determining the private key from the wallet identifying token (and vice versa) is very difficult, if not impossible, and extremely time consuming or prohibitively expensive.

In some embodiments, some or all of the messages sent by the consumer device to the merchant device (e.g., via an unsecured direct wireless connection) may be secured with the wallet identifying token. Messages that are signed with the wallet identifying token (e.g., the wallet identifying token is appended or otherwise included with the message) may be used to identify the message sender and/or to authenticate the message sender (e.g., to prove that the sender is identified correctly). For example, if the central system receives a wallet identifying token from a merchant device in association with a proposed consumer device payment that does not match a valid (e.g., non-expired or otherwise expected) wallet identifying token previously sent to the consumer device, the payment may be denied.

In various embodiments, a wallet identifying token may be used for a number of purposes including identifying a consumer, sending secure data, identifying a consumer payment account, signing messages by the consumer device that demonstrate consumer consent (e.g., for a payment), proving authenticity of messages, and/or encrypting messages.

At 206, the central system may be configured to send a reserve of wallet identifying tokens generated by the central system to a consumer device. The reserve of wallet identifying tokens may be sent to the consumer device at virtually any time. For example, the consumer device may be a smart phone that is configured to download an application from the central system (e.g., an online store of smart phone applications), and the downloading, installation and/or execution of the application can trigger the consumer device to receive the wallet identifying tokens. Additionally and/or alternatively, the wallet identifying tokens may be downloaded by the consumer device at a later time, such as at the consumer's request, at the creation of a consumer payment account, via a central system push, on a schedule basis (e.g., each day, each hour, each month, etc.), upon entering a certain proximity to a merchant device, upon establishing a connection with the central system, in the course of a transaction, upon the occurrence of a specified event or condition, combinations of the above, etc.

The term "reserve of wallet identifying tokens" refers to a defined number of wallet identifying tokens that are generated by the central system and sent to a consumer device. The reserve of wallet identifying tokens may be sent to the consumer device as a group or metered out over some period of time. The reserve of wallet identifying tokens are stored locally at the consumer device and used in connection with proposed consumer transactions as discussed in further detail below with respect to FIGS. 3 and 4.

In some embodiments where each wallet identifying token includes a corresponding private key, the private keys are also sent with the wallet identifying tokens to the consumer device. The private key may be securely stored by the central system and/or securely shared with only devices authorized to validate data or messages involving the wallet identifying token or other signature created. In various embodiments, the private keys are not shared with merchant devices prior to or during any specific transaction.

As discussed in greater detail below with respect to FIG. 2b, in some embodiments, the central system may be configured to generate a plurality of generic wallet identifying tokens (e.g., wallet identifying tokens not associated with a consumer) at 204. Here, a reserve of generic wallet identifying tokens may be associated with a consumer (e.g., via consumer identifying data, a consumer payment account, and/or a consumer device identifier) prior to being sent to the consumer device as the reserve of (e.g., non-generic) wallet identifying tokens at 206.

At 208, the central system may be configured to determine an amount of wallet identifying tokens at the consumer device that have not been used. As discussed in greater detail below with respect to FIGS. 3 and 4, a wallet identifying token may be used through an interaction (e.g., to identify a consumer or to make a proposed payment) between the consumer device and a merchant device. In some embodiments, a wallet identifying token may be initiated upon use. For example, the wallet identifying token may include a parameter, field, bit(s), or other suitable data configured to indicate use. Additionally and/or alternatively, use of the wallet identifying token may be indicated by separate data, such as data in a database (e.g., in a field of a table) that may be located at the central system. Upon use, the wallet identifying token may have a limited lifetime in which it may be used to interface with a merchant device and make payments (e.g., a payment period) and/or in which secured payment approval data secured with the wallet identifying token and/or private key may be used by the merchant device in connection with a payment (e.g., a redemption period) with the central system.

In some embodiments, the central system may be configured to maintain a reserve of (e.g., unused) wallet identifying tokens at the consumer device. As a wallet identifying token is used, it may be removed from the reserve of wallet identifying tokens. In some embodiments, the central system may be configured to monitor the amount of unused wallet identifying tokens at the consumer device. For example, the central system may be configured to update a counter whenever a wallet identifying token is first used (e.g., received from the consumer device via a merchant device), as discussed in greater detail below with respect to FIGS. 4 and 5.

In an illustrative example, the reserve of wallet identifying tokens may be twenty. The consumer device may be configured to use (i.e., transmit to a merchant device, associate with payment approval data, etc.) some or all of the twenty wallet identifying tokens without an active connection to the central system and may receive additional wallet identifying tokens from the central system sufficient to maintain the twenty unused wallet identifying tokens when the active connection is reestablished.

The reserve of wallet identifying tokens may be set higher than twenty, for example, to allow for more transactions without requiring the consumer device to reestablish the active connection to the central system. Conversely, the reserve may be set lower than twenty, which may provide for greater security because fewer wallet identifying tokens that may be improperly used are stored at the consumer device at any single time (e.g., if the consumer device is lost or stolen). In some embodiments, the reserve of wallet identifying tokens may be adjustable depending on factors such as frequency of transactions, consumer configuration via the consumer device, and/or central system configuration.

If at 210 the central system determines that the consumer device includes the reserve of wallet identifying tokens, method 200 may return to 208, where the central system may be configured to continue determining the amount of wallet identifying tokens at the consumer device that have not been used. If at 210 the central system determines that the consumer device includes less than the reserve of wallet identifying tokens, method 200 may proceed to 212.

At 212, the central system may be configured to generate one or more additional wallet identifying tokens sufficient to maintain the reserve of wallet identifying tokens at the consumer device. The discussion above at 204 regarding the generation of wallet identifying tokens may be applicable at 212.

In some embodiments, such as where generic wallet identifying tokens were generated at 204, the central system may be configured to associate one or more additional generic wallet identifying tokens with the consumer (e.g., via consumer identifying data, a consumer payment account, and/or a consumer device identifier) to generate the one or more additional (e.g., non-generic) wallet identifying tokens at 212.

At 214, the central system may be configured to send the one or more additional wallet identifying tokens (and corresponding private keys) to the consumer device. The discussion above at 206 regarding the sending of wallet identifying tokens to the consumer device may be applicable at 212. Method 200 may then end at 216.

FIG. 2b shows a flow chart of an example data flow represented by method 220, which can result in wallet identifying tokens being sent to a consumer device from a central system, performed in accordance with some embodiments. In some embodiments, method 220 may be performed instead of method 200 to maintain the reserve of wallet identifying tokens at the consumer device.

Method 220 may begin at 222, and proceed to 224, where the central system may be configured to generate a plurality of generic wallet identifying tokens. The discussion above at 204 of method 200 regarding wallet identifying tokens may be applicable at 224 of method 220, and is not repeated in detail in to avoid unnecessarily overcomplicating the disclosure.

Generic wallet identifying tokens, as used herein, refers to wallet identifying tokens that are not associated with a consumer (e.g., via consumer identifying data, a consumer payment account, and/or a consumer device identifier). The central system may be configured to store the generic wallet identifying tokens (e.g., in one or more databases at the central system) for subsequent association with a consumer as required, where a generic wallet identifying token may be removed from the stored generic wallet identifying tokens upon association with a consumer.

In various embodiments, the amount, frequency, and/or timing of the generation of generic wallet identifying tokens (e.g., and associated private keys) by the central system may be based on virtually any suitable criteria, such as upon a scheduled basis, upon falling below a threshold amount, to maintain a predetermined amount, when computing resources become available, as determined by expected demand (e.g., based on daily, monthly, and/or seasonal usage patterns), or the like.

At 226, the central system may be configured to associate one or more generic wallet identifying tokens with consumer identifying data to generate a reserve of wallet identifying tokens. For example, a wallet identifying token may include a parameter, field, bit(s), or other suitable data configured to indicate an association with the consumer identifying data (and/or consumer payment account and/or consumer device identifier). Additionally and/or alternatively, the association (s) may be indicated by separate data, such as data in a database (e.g., in one or more fields of a table) that may be located at the central system. Via the association with a consumer, a reserve of non-generic wallet identifying tokens, or simply "wallet identifying tokens," may be generated.

At 228, the central system may be configured to send the reserve of wallet identifying tokens (and corresponding private keys) to the consumer device. The discussion above at 206 of method 200 may be applicable at 228, and is not repeated to avoid unnecessarily overcomplicating the disclosure. As discussed in greater detail below with respect to FIGS. 3 and 4, a wallet identifying token may be used during an interaction (e.g., to identify a consumer or to make a proposed payment) between the consumer device and a merchant device, where it may be removed from the reserve of wallet identifying tokens.

At 230, the central system may be configured to receive a request for one or more additional wallet identifying tokens from the consumer device. For example, the one or more additional wallet identifying may be an amount needed to maintain the reserve of wallet identifying tokens at the consumer device. As such, the consumer device may be configured to monitor the amount of unused wallet identifying tokens at the consumer device and/or determine the one or more additional wallet identifying tokens that are needed to maintain the reserve of wallet identifying tokens. Alternatively and/or additionally, the central system may be configured to poll the consumer device or otherwise cause the consumer device to send the request for, and/or other message indicating a need for, one or more additional wallet identifying tokens to complete or fulfill its reserve.

Communication between the central system and the consumer device may occur at virtually any time, as discussed above at 206 of method 200. For example, the consumer device may be configured to send the request on a scheduled basis, upon establishing a connection with the central system, upon the reserve of wallet identifying tokens falling below a threshold amount, upon being polled by the central system, upon occurrence of a specified event or condition, and/or combinations of the above.

At 232, the consumer device may be configured to associate one or more additional generic wallet identifying tokens with consumer identifying data to generate the one or more additional wallet identifying tokens. The discussion above at 226 may be applicable at 232. In some embodiments, each request from the consumer device at 230 may be for only a single wallet identifying token, for a plurality of wallet identifying tokens, and/or for an amount of wallet identifying tokens sufficient to maintain the reserve of wallet identifying tokens at the consumer device. As such, the central system may be configured to generate an appropriate number of additional wallet identifying tokens at 232. In some embodiments, as discussed above in method 200, the central system may not store generic wallet identifying tokens, and instead, may generate the one or more additional wallet identifying tokens (e.g., including associations with a consumer) as needed at 232.

At 234, the one or more additional wallet identifying tokens may be sent to the consumer device. Method 220 may then end at 236.

FIG. 2c shows a flow chart of an example data flow represented by method 240, which can result in wallet identifying tokens being sent to a consumer device from a central system, performed in accordance with some embodiments. The method 240 may be performed instead of method 200 or 220 to maintain the reserve of wallet identifying tokens at the consumer device.

Method 240 may begin at 242, and proceed to 244, where the central system may be configured to generate a plurality of generic wallet identifying tokens. At 246, the central system may be configured to associate one or more of the generic wallet identifying tokens with consumer identifying data to generate a reserve of wallet identifying tokens. At 248, the central system may be configured to send the reserve of wallet identifying tokens (individually or collectively) with corresponding private keys to the consumer device. The discussion above at 224, 226 and 228 of method 220 may be applicable at 244, 246 and 248, and are not repeated to avoid unnecessarily overcomplicating the disclosure. Also as discussed above, one or more of the reserve of wallet identifying tokens may be used and removed from the reserve of wallet identifying tokens. Method 240 may then proceed to 250.

At 250, the central system may be configured to send one or more of the generic wallet identifying tokens (with corresponding private keys) to the consumer device. For example, the central system may be configured to broadcast generic wallet identifying tokens to various consumer devices at regular intervals. Such regularly broadcast generic wallet identifying tokens may be used to maintain a reserve of wallet identifying tokens at one or more consumer devices. In some embodiments, the central system may send a predetermined number of generic wallet identifying tokens for a given period of time. For example, the predetermined number may be the same as the reserve of wallet identifying tokens (e.g., 20 in some examples) or may be less than the reserve of wallet identifying tokens.

At 252, the central system may be configured to receive an indication from one receiving consumer device that at least one of the one or more of the generic wallet identifying tokens was stored by the consumer device to complete or fulfill its reserve. The central system may be configured to receive other indications from other receiving consumer devices that other generic wallet identifying tokens were stored by such consumer devices to complete or fulfill their respective reserves.

At 254, the central system may and/or consumer device may be configured to associate the at least one of the one or more generic wallet identifying tokens with the consumer identifying data to generate at least one additional wallet identifying token. The discussion above regarding the association of a generic wallet identifying token with consumer identifying data to generate a wallet identifying token at 226 of method 200 may be applicable at 254. For example, the central system and/or consumer device may be configured to update a parameter, field, bit(s), or other suitable data of the generic wallet identifying token to indicate an association with the consumer identifying data (and/or consumer payment account and/or consumer device identifier). Additionally and/or alternatively, the central system may be configured to update separate data, such as data in a database (e.g., in one or more fields of a table) that may be located at the central system. In some embodiments, the consumer device may be configured to add the at least one wallet identifying token to the reserve of wallet identifying tokens. Method 240 may then end at 256.

Wallet Identifying Token Payment Period

FIG. 3 shows an example data flow of a method 300 for transmitting and managing wallet identifying tokens between a consumer device, a merchant device, and a central system in accordance with some embodiments.

At 302, the central system may be configured to send a plurality of wallet identifying tokens (with corresponding private keys) to the consumer device. The discussions above of methods 200, 220, and 240 may be applicable at 302 and are not repeated to avoid unnecessarily overcomplicating the disclosure.

At 304-308, the consumer device and the merchant device may be configured to form a connection. In some embodiments, the connection may be formed without the consumer device and/or the merchant device having active Internet access at the time of the connection (e.g., an active connection to the central server). For example, the connection may be a wireless connection over a PAN (e.g., via PAN network 716 shown in FIG. 7). Some suitable PAN protocols may include Bluetooth, Infrared Data Association (irDA), wireless USB, ZigBee, WiFi, and Z-Wave. In some embodiments, other types of connections between the consumer device and merchant device, such as direct wire, Internet, near field communications and/or radio frequency identification technologies, may be used. A "PAN connection," as used herein, may refer to any wireless connection between the consumer device and the merchant device (e.g., via network 716 rather than network 708, as shown in FIG. 7). Similarly, a "PAN," as used herein, may refer to any suitable network for the connection.

Depending on the protocol used, at 304, the consumer device may begin announcing a consumer service to other devices, such as the merchant device. For example, a process and/or application may configure the consumer device to broadcast (e.g., via Bluetooth) one or more suitable messages. Furthermore, the consumer device may be configured to allow the consumer to enable or disable the announcing of the consumer service (e.g., via a user interface).

In some embodiments, the consumer service may include one or more background processes that may run while the consumer device is locked, in a low-power mode, and/or executing other applications in the foreground. In some embodiments, the one or more broadcasted messages may include a wallet identifying token and/or be encrypted using a wallet identifying token.

At 306, the merchant device may begin discovering the consumer service. For example, a process and/or application may execute on the merchant device that configures the merchant device to discover other devices, such as the consumer device, that are currently announcing the consumer service. In some embodiments, discovery of the consumer service by the merchant device may be initiated after an employee has logged in, authenticated, or otherwise enabled such functionality on the merchant device.

In some embodiments, the consumer device may be configured to discover the consumer service while the merchant device may be configured to announce the consumer service. Additionally and/or alternatively, both devices may be configured to be capable of announcing and discovering the consumer service. For example, both devices may discover compatible devices and/or be discovered by compatible devices.

At 308, a connection between the merchant device and the consumer device may be created. For example, the consumer device and merchant device may come within a certain discovery range, such as when a consumer carrying the consumer device enters the merchant's shop. In some embodiments, the discovery range may be set by the merchant device and/or the consumer device and/or by the range at which the devices can be located from each other and still be able to communicate (e.g., Bluetooth capable devices may have a communicable range between 10 and 100 meters, depending on the type of device(s) being utilized).

At 310, the consumer device may be configured to initiate a payment period (and redemption period, in some embodiments as discussed in greater detail below in method 400) for a first wallet identifying token. For example, the consumer device may be configured to select the first wallet identifying token from the plurality of wallet identifying tokens received from the central system at 302. The selection of the first wallet identifying token from the plurality of wallet identifying tokens may be based on the order in which the wallet identifying tokens are received from the central system, an order value associated with and/or contained within each wallet identifying token, random selection, and/or any other suitable technique.

In some embodiments, the consumer device may be configured to timestamp the first wallet identifying token, where the payment period is initiated based on the time stamp. For example, the wallet identifying token may include a parameter, field, bit(s), or other suitable data configured to receive the time stamp. As such, the consumer device may initiate the first wallet identifying token by writing suitable data to the first wallet identifying token.

As discussed above with respect to method 200, the consumer device may be further configured to remove the first wallet identifying token from a reserve of wallet identifying tokens at the consumer device after initiating the payment period for the first wallet identifying token.

At 312, the consumer device may be configured to send the first wallet identifying token to the merchant device. For example, the first wallet identifying token may be used as a secure reference for a request by the merchant device to the central system for additional consumer data. As such, the first wallet identifying token may be sent to the merchant device in place of actual consumer data that may be readily stolen by an unauthorized device via the PAN connection.

In some embodiments, the consumer's name, URL for accessing the image data representing a picture of the consumer (e.g., as associated with the payment account at 210 of method 200), the image data itself, and/or other suitable consumer identification information may be sent by the consumer device with the first wallet identifying token (e.g., as one or messages that are encrypted, signed, or simply unsecured). Such embodiments may be less secure with respect to the consumer data that is sent via the PAN connection but may advantageously provide for quicker consumer identification by the merchant device and/or offline consumer identification by the merchant device.

At 314, the merchant device may be configured to establish a secure connection with the central system (e.g., via network 708 shown in FIG. 7). For example, an employee may provide login data to the central system that may be used to identify and authenticate the employee and/or merchant. As discussed above, the secure connection between the merchant device and the central system may be established at any suitable time, such as before the merchant device has connected with the consumer device at 308, or before the consumer device enters within communicable proximity to the merchant device. For example, the merchant device may be configured to keep the secure connection with the central system in the course of assisting consumers. In some embodiments, the merchant device may connect to the central system via a local area network (LAN) (e.g., via one or more wireless routers for mobile devices or Ethernet if the merchant device is wired) that is connected to the Internet. Additionally and/or alternatively, the merchant device may connect to the central system without using a local access point, such as via a mobile broadband connection.

At 316, the merchant device may be configured to send the first wallet identifying token received from the consumer device to the central system. For example, the first wallet identifying token may be sent via the secure connection established at 314.

At 318, the central system may be configured to validate the first wallet identifying token. For example, the central system may perform the validation based at least in part on whether the first wallet identifying token matches or otherwise corresponds with one of the plurality of wallet identifying tokens sent to the consumer device at 302. In some embodiments, the central system may be configured to ensure that the first wallet identifying token received from the merchant device at 318 originated from a consumer device (e.g., at 312) that is authorized to use the consumer payment account. For example, authorized consumer devices may include consumer device identifiers that are associated with wallet identifying tokens at the central system. As such, the consumer device may also be configured to send a consumer device identifier to the merchant device and the merchant device may be configured to send the consumer device identifier to the central system.

In some embodiments, validating the first wallet identifying token may further include determining whether the payment period and/or redemption period (discussed in further detail with respect to method 400) has lapsed. As discussed above, the payment period and/or redemption period may be initiated by the consumer device at 310 via a time stamp on the wallet identifying token. As such, the central system may include a clock or other time keeping device and may be further configured to compare the time stamp against the clock. If the payment period and/or redemption period has not lapsed, the central system may be configured to validate the wallet identifying token. If the payment period and/or redemption period has lapsed, the central system may be configured to not validate the first wallet identifying token.

In some embodiments, the central system may be configured to initiate the payment period and/or redemption period for the wallet identifying token. For example, upon receiving the first wallet identifying token from a merchant device for the first time, the central system may be configured to change a parameter, field, bit(s), or other suitable data configured to indicate the initiation of the payment period and/or redemption period for the first wallet identifying token. Alternatively and/or additionally, the central system may be configured to update separate data, such as data in a database (e.g., in a field of a table) that may be located at the central system, to indicate the initiation of the payment period and/or redemption period for first wallet identifying token. After initiating the payment period and/or redemption period, the central system may be further configured to send a payment period indication and/or redemption period indication to the consumer device. The payment period indication and/or redemption period indication may be sent directly to the consumer device (e.g., via the Internet) or via the merchant device (e.g., to the merchant device via the secure connection, and then to the consumer device via the PAN connection). Upon receiving the payment period indication and/or redemption period indication, the consumer device may be configured to timestamp and or otherwise determine the payment period and/or redemption period indication for the first wallet identifying token. In some embodiments, the central system may be further configured to send the first wallet identifying token back to the consumer device with an associated timestamp.

If the first wallet identification token is validated, the central system may be configured to send consumer identifying data associated with the first wallet identifying token to the merchant device at 320. In some embodiments, the consumer identifying data may include image data, consumer name, a consumer identifier, or the like that may be kept secure by the central system (e.g., rather than being stored in the consumer device and sent over the PAN connection to merchant devices). As discussed above, the association between the first wallet identifying token and the consumer identifying data (as well as consumer-related data or other data of the consumer) may be stored in one or more databases (e.g., central database 706 shown in FIG. 7) of the central system. As such, a central server of the central system may be configured to request the consumer identifying data from a central database based on the first wallet identifying token received from the merchant device.

In some embodiments, the merchant device may be configured to receive other types of consumer data from the central system at 320. The consumer data may include, for example, consumer profile data, consumer payment account data, dine-in preference data, third party account data, menu item purchase history data, social network data, consumer preference data, promotional vouchers of the merchant available for purchase, promotional vouchers redeemable at the merchant, etc. As such, the merchant may use some or all of the consumer data to enhance consumer service.

In some embodiments, the merchant device may be configured to use the consumer information received from the central system to facilitate consumer service. For example, the merchant device may be configured to offer promotional deals and/or rewards, as discussed in greater detail in U.S. Provisional Patent Application No. 61/715,230, entitled "Consumer Presence Based Deal Offers," incorporated by reference in its entirety above. The merchant device may also use the consumer information to facilitate consumer service.

At 322, the merchant device may be configured to send merchant data to the consumer device. For example, the merchant data may include merchant identifying data, or other data, that indicates the merchant's identity to the consumer device. The merchant data may further include information about the merchant, such as merchant name, items for sale (e.g., products, services, etc.), promotional deals, promotional vouchers of the merchant available for purchase, purchased promotional vouchers redeemable at the merchant, rewards, sales, etc.

At 324, the consumer device may be configured secure the consumer approval data by creating an electronic signature using the private key associated with the first wallet identification token. The merchant device may be further configured to generate secure payment approval data (e.g., using the merchant data, transaction data, the consumer approval data and/or the like) and cause it to be transmitted to the central server at 326, where the secure payment approval data may be validated and transaction may be processed. Payment is discussed in further detail with respect to method 400 below.

At 328, the consumer device may be configured to monitor the payment period for the first wallet identifying token. For example, the consumer device may include a clock or other timekeeping device that may be used to determine whether the payment period has lapsed. In some embodiments, the consumer device may be configured to compare the timestamp on the first wallet identifying token with a current time to determine whether the payment period has lapsed.

If the payment period for the first identifying token has not lapsed, the consumer device may be configured to keep using the first identifying token. For example, if the PAN connection with the merchant device is lost and then reestablished for any reason (e.g., consumer leaves the merchant shop and later returns, signal interference, faulty connection, device malfunction, power loss, etc.), the consumer device may be configured to reestablish the PAN connection with the merchant device using the first wallet identifying token and/or perform a payment using the first wallet identifying token, as discussed above at 304-326. Furthermore, if the consumer device establishes a PAN connection with a second merchant device (e.g., of the same merchant or at a different merchant), the consumer device may be configured to continue using the first wallet identifying token as discussed above at 304-326, except with the second merchant device.

If the payment period for the first identifying token has lapsed, the consumer device may be configured to begin using a second wallet identifying token (e.g., of the plurality of wallet identifying tokens received from the central system at 302). At 330, the consumer device may be configured to initiate a second payment period for the second wallet identifying token when the payment period for the first wallet identifying token has lapsed. The discussion above regarding initiating the payment period for the first wallet identifying token at 310 may be applicable to initiating the second payment period for the second wallet identifying token and is not repeated in detail to avoid unnecessarily overcomplicating the disclosure.

As discussed above, the consumer device may be further configured to remove the second wallet identifying token from a reserve of wallet identifying tokens at the consumer device after initiating the second payment period for the second wallet identifying token.

Furthermore, if the consumer device has established a connection with a second merchant device when the payment period for the first wallet identifying token has lapsed, the consumer device may be configured to send the second wallet identifying token to the second merchant device rather than the first wallet identifying token for identification and/or payment.

In some embodiments, the consumer device may be configured to receive an indication from the central system (e.g., directly or via the merchant device) and/or the merchant device to determine lapse of the payment period. As such, monitoring the payment period for the first wallet identifying token may include determining that the payment period has lapsed based on the received indication. Furthermore, the merchant device and/or central system may include a clock or other timekeeping device that may be used to determine whether the payment period has lapsed, such as by comparing the timestamp on the first wallet identifying token with a current time.

At 332, the consumer device may be configured to send the second wallet identifying token to the merchant device (or second merchant device, if applicable). As such, steps 312-326 may be repeated as described above, except using the second wallet identifying token instead of the first wallet identifying token. For example, after receiving the second wallet identifying token, the merchant device may be configured to send the second wallet identifying token to the central system. The central system may then validate the second wallet identifying token and send consumer information to the merchant device if the second wallet identifying token is validated. The consumer device may use the second identification token during its payment period to make a payment by sending secured payment approval data to the merchant device. The consumer device may further monitor the second payment period for the second wallet identifying token and initiate a third wallet identifying token when the second payment period for the second wallet identifying token has lapsed, and so forth. Method 300 may then end.

Wallet Identifying Token Redemption Period

FIG. 4 shows an example of a data flow of a method 400 for facilitating a payment based on a redemption period for a wallet identifying token, performed in accordance with some embodiments. As such method 400 may be performed at 324 of method 300 (e.g., using the first wallet identifying token) and/or after 330 of method 332 (e.g., using the second wallet identifying token). A redemption period for a wallet identifying token, as used herein, refers to a period of time within which payment approval data secured with a wallet identifying token or associated private key (i.e., secured payment approval data) may be redeemed (e.g., validated) with the central system. For example, when the wallet identifying token is used for the first time (e.g., to establish a connection as discussed above at 310 for the first wallet identifying and/or at with respect to 330 for the second wallet identifying token in method 300), the redemption period for the wallet identifying token may begin. As such, the redemption period may begin at the same time as the payment period for a single wallet identifying token.

In some embodiments, the redemption period for a wallet identifying token may at least be the same or longer than the payment period. For example, the redemption period may be 24 hours while the payment period may be 12 hours. Here, a consumer may browse a merchant shop for up to 12 hours using a single wallet identifying token (e.g., before the consumer device begins using a second wallet identifying token) while the merchant may redeem payment approval data secured by the wallet identifying token for an additional 12 hours after the payment period has lapsed (e.g., when the payment period and redemption period are both initiated when the consumer first enters the shop). A longer redemption period may give merchants more time to redeem payments, which may be advantageous when a merchant does not have an active connection to the central system. A shorter redemption period, on the other hand, may provide greater security because secured payment approval data may be processed and/or confirmed nearer to the time of purchase.

In some embodiments, the same techniques used to indicate initiation of the payment period may be used to indicate initiation of the redemption period. For example, the wallet identifying token may include a parameter, field, bit(s), or other suitable data configured to indicate initiation of the redemption period and/or payment period. Additionally and/or alternatively, initiation of the redemption period and/or payment period of the wallet identifying token may indicated by separate data, such as in a database (e.g., in a field of a table) that may be located at the central system.

Method 400 may begin at 402, where the merchant device may be configured to determine a payment amount based on item data. For example, the item data include an indication of one or more items selected by the consumer. Furthermore, the item data may include price data for the one or more items that may be used to determine the payment amount. In some embodiments, the merchant device may be a point-of-sale (POS) device that includes one or more input components coupled thereto (e.g., a barcode scanner, magnetic stripe reader, user keypad, touchscreen display, etc.) configured to receive the item data.

In some embodiments, the payment amount may reflect the redemption of a promotional voucher, coupon, reward, or other promotional offering. For example, the value of a redeemed promotional voucher may be subtracted from the payment amount. Furthermore, the payment amount may include a tax amount determined based on the total cost of the one or more selected items.

At 404, the merchant device may be configured to send transaction data (which may include the payment amount) to the consumer device. In some embodiments, merchant device may be configured to send the transaction data wirelessly to the consumer device via the PAN connection between the merchant device and the consumer device (e.g., as established using method 300).

In some embodiments, the consumer device may be configured to perform one or more functions of the merchant device discussed above at 402. For example, the consumer device may be configured to receive, from the merchant device and/or the central system, item data which may be used to consumer device to select one or more items and generate the payment amount (e.g., via a graphical user interface). Additionally and/or alternatively, the consumer device may include one or more input components coupled thereto (e.g., a barcode scanner, magnetic stripe reader, user keypad, touchscreen display, etc.) configured to receive the item data. In some embodiments, the consumer device may be configured to select one or more items online, such as even before the consumer has entered the merchant shop, as discussed in greater detail in U.S. patent application Ser. No. 13/657,728, entitled "Facilitating Online Transactions," incorporated by reference in its entirety above.

In some embodiments, the merchant device may be configured to allow the merchant to select from a plurality of payment types. For example, the merchant may ask the consumer how the consumer would like to pay. The consumer may decide, for example, to pay by cash, credit card or otherwise without using the consumer device. As such, the merchant device may be further configured to accept alternative forms of payment. If the consumer decides to pay via the consumer device, the merchant may so indicate by selecting a pay-by-consumer device selection on the merchant device (e.g., via a graphical user interface), which may cause the merchant device to send the payment amount to the consumer device.

At 406, the consumer device may be configured to determine whether to approve the transaction. In some embodiments, approving the transaction may include generating an indication of approval. FIG. 5 shows an example transaction approval display 500 that may be shown on the consumer device that includes the payment amount. Transaction approval display 500 may include sub-total display 502, tip display 504 (e.g., an employee payment amount to be paid to an employee of the merchant), tax display 506 and payment amount display 508. Furthermore, the consumer may select shopping list selection 514 to view a listing of items (e.g., the one or more items whose price data provides a basis for the sub-total).

Via transaction approval display 500, the consumer device may be configured to allow the consumer to select the employee payment amount. For example, the consumer may select a tip percentage using tip selection 510. Responsive to a tip selection, tip display 506 and total amount display 508 may be updated to reflect the new tip and total amounts. As such, a payment amount, as used herein, may further include the tip amount.

If the consumer is satisfied with the payment, the consumer may select approve payment selection 512 to indicate approval of the transaction. Additionally and/or alternatively, the consumer device may be configured to allow and/or require the user to provide an additional indication of consent. For example, the consumer may be prompted to select a box (e.g., a checkbox that indicates consent), provide login data, generate a signature (e.g., via a touch sensitive device such as a touch sensor), enter a pin number, and/or provide a biometric identifier (e.g., a fingerprint, voice message, retina scan, behavioral identifier, etc.). If the consumer is not satisfied with the payment amount or otherwise does not approve of the payment, the consumer may select cancel order selection 516.

In some embodiments, the consumer device may be configured to automatically approve the payment amount based upon satisfaction of one or more trigger conditions. As such, the consumer device may be configured to allow the consumer to preapprove payments (e.g., in the form of a predetermined tip percentage for tip payments), such as even prior to coming within proximity to the merchant device as discussed in method 300.

For example, the identity of the merchant may serve as a trigger condition for automatic payment in some embodiments. The consumer may be allowed to add one or more merchants to an approved merchant list, such as via communications with the central system. As such, upon receiving a payment request from a merchant on the approved merchant list, the consumer device may be configured to automatically generate and send the payment approval data to the merchant device. The merchant list may be stored on the consumer device and/or the central system. In some embodiments, the consumer device may be configured to use the merchant data received from the merchant device at 324 of method 300 to determine whether the merchant is on the approved merchant list.

In some embodiments, the location of the consumer device may serve as a trigger condition for automatic payment. For example, the consumer device may be configured to allow the consumer to simply walk out of the merchant shop after receiving the transaction data, which may include a payment amount, at 404 (e.g., from the merchant device or by consumer input via the consumer device). The location of the consumer device may be tracked such that the payment approval data is sent to the merchant device when the consumer device leaves the merchant's shop, becomes a certain distance from the merchant device, drops out of communicable range with the merchant device, etc.

In some embodiments, reception of the transaction data by the consumer device may serve as a trigger condition for automatic payment. Combinations of one or more trigger conditions may be used. For example, the consumer device may be configured to automatically approve payments only to merchants on the approved merchant list upon receiving the payment amount from a merchant device of the approved merchant. Other example trigger conditions may include merchant device location, merchant type (e.g., retailers, restaurants, etc.), the payment amount (e.g., automatically approve payments below a specified amount), a per-day cost threshold (e.g., up to $100 per day can be automatically approved), etc.

In some embodiments, the consumer device may be configured to allow a consumer to set automatic approvals on or off. Additionally and/or alternatively, a consumer may specify that only certain types of transactions require approval. In another example, approval for an initial payment may be required at a merchant, but not for subsequent payments. Similarly, an approved merchant may be removed or otherwise set such that the next and/or every transaction with the merchant requires manual approval.

In some embodiments, the merchant device may be configured to set whether to allow automatic payment approval by consumer devices based on one or more trigger conditions. For example, the merchant device may specify that all payments require manual approval, payments from certain consumers require manual approval, and/or payments above a certain threshold amount require manual approval, etc.

Returning to FIG. 4, the consumer device may be configured to generate consumer approval data for the payment amount using a wallet identifying token at 408 and an electronic signature created based on the private key associated with the wallet identifying token. Consumer approval data, as used herein, refers to data that is configured to provide an indication that the consumer has approved the payment and may refer to payment approval data that is signed or otherwise secured using a wallet identifying token and/or an electronic signature created using the private key associated with the wallet identifying token prior to lapse of the payment period for the wallet identifying token.

In some examples, the consumer approval data, taking the form of an electronic signature, may be generated by using an algorithmic transformation, such as hashed (e.g., using cryptographic hash functions such as SHA-1). In one embodiment, the electronic signature created using the private key associated with the wallet identifying token may be a hash of the private key and at least some portion of the payment data. For example, the consumer approval data may be sent to the merchant device via one or more messages that may also include transaction data (e.g., merchant payment amount, employee payment amount, total payment amount, time of transaction, location, tip etc.) and/or the additional indication of consent. In examples, where a tip or other value is added, the consumer device may include an indication of the tip, an additional authorization or may otherwise cause an indicated tip to be added to the transaction data or otherwise provided to the merchant device (e.g., for approval) and ultimately to the control system. In some embodiments, the consumer approval data may include consumer data (e.g., consumer name, payment source information, payment account identification, etc.).

Alternatively or additionally, in some embodiments, at least one of the one or more messages may be encrypted using the wallet identifying token. As discussed above, the wallet identifying token may be a public key for encryption with an associated private key for decryption that is stored in the central system. Alternatively and/or additionally, at least one of the one or more messages (hashed or otherwise) may be signed using the wallet identifying token. For example, the wallet identifying token may be appended or otherwise included with a message to ensure the authenticity of the message (e.g., that the message was received from the consumer device). In some embodiments, both signing and encryption may be used.

In some embodiments, the one or more messages (encrypted, signed, hashed or otherwise) may be formatted with JavaScript Object Notation (JSON), where each piece of data is associated with a field. For example, an encrypted, hashed and/or signed message (e.g., in any order) may be included within a field as specified by the JSON format. Alternatively, unsecured messages may be formatted with JSON and then the formatted massage may be hashed, encrypted and/or signed (e.g., in any order).

At 412, the consumer device may be configured to send the consumer approval data to the merchant device. The consumer approval data may be safely sent via the PAN connection between the merchant device and the consumer device. For example, where the wallet identifying token and/or private key based electronic signature was used to secure the payment approval data, only a device that includes the corresponding private key for the wallet identifying token (e.g., the central system) will be able to validate the consumer approval data and release the consumer identifying data prior to lapse of the payment period and/or redemption period.

At 414, the merchant device is configured to generate secured payment approval data. In some example embodiments, the secured payment approval data is a combination or other association of the consumer approval data and the transaction data sent at 404. In some examples, the consumer approval data may take the form of the secured payment approval data and, in such embodiments, the merchant device may function as a pass through device.

In some embodiments, the secured payment approval data may include the consumer approval data and the total amount (e.g., the payment amount sent to the consumer device with the transaction data at 404 plus the tip amount added by the consumer). For example, the consumer device may be configured to send the consumer approval data with the tip amount to the merchant device at 412, where the tip amount is separate from the consumer approval data. The merchant device may then be configured to add the tip amount to payment amount to generate the total amount, which may be a part of the secured payment approval data.

At 416, the merchant device may be configured to send the secured payment approval data to the central system. In some embodiments, the secured payment approval data may be sent to the central system without any substantial processing and/or decoding by the merchant device. As such, the central system may be configured to facilitate financial transactions between the consumer device and merchant device (e.g., process payments from the consumer payment account to the merchant).

In some embodiments, the merchant device may be configured to monitor whether the redemption period for the wallet identifying token has lapsed. For example, the merchant device may only send the secured payment approval data secured with the wallet identifying when redemption period has not lapsed because the secured payment approval data. In some embodiments, the merchant device may include a clock or other timekeeping device that may be used to determine whether the redemption period has lapsed. If the redemption period has lapsed, the merchant device may be configured to request a second wallet identifying token and/or second payment approval data secured with the second wallet identifying token and/or second electronic signature created based on a second private key associated with the second wallet identifying token from the consumer device.

In some embodiments, the merchant device may be configured to store the secured payment approval data for a period of time prior to sending the secured payment approval data to the central system. For example, if the secure connection with the central system is lost or otherwise unavailable, the secured payment approval data may be stored until the secure connection is reestablished. As such, the merchant device may be further configured monitor the redemption period to ensure that the secured payment approval data is sent within the redemption period when the secure connection is reestablished.

At 418, the central system may be configured to validate the wallet identifying token by determining whether the redemption period has lapsed. The central system may further determine whether the payment period has lapsed, although such a determination may not be necessary in example embodiments where the redemption period is the same or longer than the payment period. In some embodiments, the central system may include a clock or other timekeeping device that may be used to determine whether the redemption period has lapsed, such as by comparing the timestamp on the wallet identifying token with a current time. In some embodiments, where a wallet identifying token was used as a signature or otherwise included with the payment approval data to secure its authenticity, the central system may be configured to ensure that the received wallet identifying token corresponds with a wallet identifying token initially sent to the consumer device and/or that that the payment period and/or redemption period for the wallet identification token has not lapsed. In other embodiments, where an electronic signature based on a private key was used or otherwise included with the payment approval data to secure its authenticity, the central system may be configured to ensure that the received electronic signature corresponds with a private key sent accompanying a wallet identifying token initially sent to the consumer device and/or that that the payment period and/or redemption period for the wallet identification token/private key has not lapsed.

If the redemption period has lapsed, the central system may be configured to invalidate a wallet identifying token/ private key used to secure the payment approval data and/or otherwise refuse to facilitate the financial transaction indicated by the secured payment approval data. A message indicating a failed payment may be sent to the merchant device and/or consumer device, and method 400 may end.

If the redemption period has not lapsed, the central system may be configured to determine the private key associated with the wallet identifying token at 420. As discussed above at 204 of method 200, the central system may be configured to generate the wallet identifying token with an associated private key. For example, each private key may be stored in one or more central databases at the central system and referenced via their associated wallet identifying tokens. As such, the central system may be configured to request the private key associated with the wallet identifying token that was used to secure the secured payment approval data at 408 by the consumer device from one or more databases.

At 422, the central system may be configured to validate the secured payment approval data by generating or otherwise re-creating the received electronic signature using the private key. In one embodiment, the central system re-creates the received electronic signature by using the private key to create a hash value for a least a portion of the secured payment approval data. As discussed above, the private key may be configured to validate the secured payment approval data such that the data may be relied upon and thereby processed or otherwise used.

At 424, the central system may be configured to facilitate a financial transaction based on the payment approval data. The payment approval data may indicate, in some examples, an appropriate employee account, merchant account, consumer payment account, payment source, employee payment amount, merchant payment amount, and/or the like. As such, the central system may be configured to process the payment by removing an appropriate amount from the consumer payment account and adding the appropriate amounts to the merchant account and/or employee account.

In some embodiments, processing the payment may further include communicating with one or more separate payment processing servers, third party servers, credit card servers, bank account servers, and/or any other type of financial transaction server that may be suitable to complete the financial transaction. For example, the central system may send transaction data to one or more third party servers and receive an indication as to whether the financial transaction was successful.

At 426, the central system may be configured to send a payment confirmation and/or receipt to the merchant device. For example, the payment confirmation may indicate whether the payment was successfully processed. An indication may be shown on the merchant device to alert the merchant. For example, if the payment was not successful, the merchant may request that the consumer provide an alternate form of payment and/or to resubmit the payment via the consumer device. Additionally and/or alternatively, the central system may be configured to send a receipt for the payment to the merchant device At 428, the merchant device may be configured to send the payment confirmation and/or receipt to the consumer device, such as via the PAN connection. The payment confirmation and/or receipt may alternatively, and/or additionally, be sent directly from the central system to the consumer device, such as when a direct connection to the consumer device is available. FIG. 6 shows an example receipt display 600, in accordance with some embodiments. Receipt display 600 may be shown on the consumer device to provide an indication to the consumer that the financial transaction was successfully. As such, receipt display 600 may include transaction data at 602 and payment confirmation display 604, confirming payment via the consumer device. Method 400 may then end.

Exemplary System Architecture

FIG. 7 shows system 700 including an example network architecture, which may include one or more devices and sub-systems that are configured to implement some embodiments discussed herein. For example, system 700 may include central system 702, which can include, for example, central server 704 and central database 706, among other things (not shown). Central server 704 may be any suitable network server, a plurality of networked servers, and/or other type of processing device. Central database 706 may be any suitable network database configured to store information that may be used to facilitate the techniques as discussed herein. In this regard, system 702 may include, for example, at least one backend data server, network database, cloud computing device, among other things.

Central system 702 may be coupled to one or more merchant devices (e.g., merchant device 710) via network 708. In this regard, network 708 may include any wired or wireless communication network including, for example, a wired or wireless local area network (LAN), personal area network (PAN), metropolitan area network (MAN), wide area network (WAN), mobile broadband network, or the like, as well as any hardware, software and/or firmware required to implement it (such as, e.g., network routers, etc.). For example, network 708 may include a cellular telephone, an 802.11, 802.16, 802.20, and/or WiMax network. Further, the network 708 may include a public network, such as the Internet, a private network, such as an intranet, or combinations thereof, and may utilize a variety of networking protocols now available or later developed including, but not limited to TCP/IP based networking protocols.

As discussed above, merchant device 710 may be associated with a merchant, such as a retail store, restaurant, etc. or one or more employees of the merchant. In some embodiments, merchant device 710 may be a POS device that is configured to receive payments at the merchant's shop. As such, merchant device 710 may include a personal computer and/or other networked device, such as a cellular phone, tablet computer, mobile device, etc., that may be used for any suitable purpose in addition to providing POS functionality at the restaurant.

System 700 may further include one or more consumer devices (e.g., consumer device 712). Consumer device 712 may connect with merchant device 710 via network 708 and/or PAN network 716. As such, consumer device 712 may be configured to make communicate with merchant device 710 via PAN network 716 even if consumer device 712 and/or merchant device 710 do not have active connections with network 708.

In some embodiments, central system 700 may further include one or more third party systems (e.g., third party system 714), among other things. In some embodiments, different third party systems may be associated with different types of payment sources or payment destinations. Thus for each payment source or destination, data may be sent to an appropriate third party system (e.g., a credit card transaction server, a bank account, etc.) to validate and/or process payments. Furthermore, employee accounts, merchant accounts, and/or consumer payment accounts may be associated with one or more third party accounts that are provided by third party system 714.

In some embodiments, central system 702 may be a multi-tenant database system configured to provide services to a plurality of consumers and merchants. Additionally and/or alternatively, central system 2702 may be configured to include, or work in connection with, online ordering systems (e.g., shop online and pickup), promotional systems (e.g., deal voucher accounts, offerings, purchases, and redemptions, where the value of a redeemed voucher may be deducted from the payment), merchant systems (e.g., kitchen systems for restaurants), and/or appointment systems (e.g., scheduling a reservation at a restaurant). As such, the techniques disclosed herein may be applicable to any environment that involves consumer and merchants.

FIG. 8 shows a schematic block diagram of circuitry 800, some or all of which may be included in, for example, central system 804, consumer device 812, and/or merchant device 810. In accordance with some example embodiments, circuitry 800 may include various means, such as one or more processors 802, memories 804, communications modules 806, and/or input/output modules 808.

In some embodiments, such as when circuitry 800 is included in merchant device 810 and/or central system 802, payment/redemption module 810 may also or instead be included. As referred to herein, "module" includes hardware, software and/or firmware configured to perform one or more particular functions. In this regard, the means of circuitry 800 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 804) that is executable by a suitably configured processing device (e.g., processor 802), or some combination thereof.

Processor 802 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 28 as a single processor, in some embodiments, processor 802 comprises a plurality of processors. The plurality of processors may be embodied on a single computing device or may be distributed across a plurality of computing devices collectively configured to function as circuitry 800. The plurality of processors may be in operative communication with each other and may be collectively configured to perform one or more functionalities of circuitry 800 as described herein. In an example embodiment, processor 802 is configured to execute instructions stored in memory 804 or otherwise accessible to processor 802. These instructions, when executed by processor 802, may cause circuitry 800 to perform one or more of the functionalities of circuitry 800 as described herein.

Whether configured by hardware, firmware/software methods, or by a combination thereof, processor 802 may comprise an entity capable of performing operations according to embodiments of the present invention while configured accordingly. Thus, for example, when processor 802 is embodied as an ASIC, FPGA or the like, processor 802 may comprise specifically configured hardware for conducting one or more operations described herein. As another example, when processor 802 is embodied as an executor of instructions, such as may be stored in memory 804, the instructions may specifically configure processor 802 to perform one or more algorithms and operations described herein.

Memory 804 may comprise, for example, volatile memory, non-volatile memory, or some combination thereof. Although illustrated in FIG. 8 as a single memory, memory 804 may comprise a plurality of memory components. The plurality of memory components may be embodied on a single computing device or distributed across a plurality of computing devices. In various embodiments, memory 804 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 804 may be configured to store information, data, applications, instructions, or the like for enabling circuitry 800 to carry out various functions in accordance with example embodiments discussed herein. For example, in at least some embodiments, memory 804 is configured to buffer input data for processing by processor 2802. Additionally or alternatively, in at least some embodiments, memory 804 may be configured to store program instructions for execution by processor 802. Memory 804 may store information in the form of static and/or dynamic information. This stored information may be stored and/or used by circuitry 800 during the course of performing its functionalities.

Communications module 806 may be embodied as any device or means embodied in circuitry, hardware, a computer program product comprising computer readable program instructions stored on a computer readable medium (e.g., memory 804) and executed by a processing device (e.g., processor 802), or a combination thereof that is configured to receive and/or transmit data from/to another device, such as, for example, a second circuitry 800 and/or the like. In some embodiments, communications module 806 (like other components discussed herein) can be at least partially embodied as or otherwise controlled by processor 802. In this regard, communications module 806 may be in communication with processor 2802, such as via a bus. Communications module 806 may include, for example, an antenna, a transmitter, a receiver, a transceiver, network interface card and/or supporting hardware and/or firmware/software for enabling communications with another computing device. Communications module 806 may be configured to receive and/or transmit any data that may be stored by memory 804 using any protocol that may be used for communications between computing devices. Communications module 806 may additionally or alternatively be in communication with the memory 804, input/output module 808 and/or any other component of circuitry 800, such as via a bus.

Input/output module 808 may be in communication with processor 802 to receive an indication of a user input and/or to provide an audible, visual, mechanical, or other output to a user. Some example visual outputs that may be provided to a user by circuitry 800 are discussed in connection with the displays described above. As such, input/output module 808 may include support, for example, for a keyboard, a mouse, a joystick, a display, an image capturing device, a touch screen display, a microphone, a speaker, a RFID reader, barcode reader, biometric scanner, and/or other input/output mechanisms. In embodiments wherein circuitry 800 is embodied as a server or database, aspects of input/output module 808 may be reduced as compared to embodiments where circuitry 800 is implemented as an end-user machine (e.g., consumer device and/or merchant device) or other type of device designed for complex user interactions. In some embodiments (like other components discussed herein), input/output module 808 may even be eliminated from circuitry 800. Alternatively, such as in embodiments wherein circuitry 800 is embodied as a server or database, at least some aspects of input/output module 808 may be embodied on an apparatus used by a user that is in communication with circuitry 800, such as for example, merchant device 810 and/or consumer device 812. Input/output module 808 may be in communication with memory 804, communications module 806, and/or any other component(s), such as via a bus. Although more than one input/output module and/or other component can be included in circuitry 800, only one is shown in FIG. 8 to avoid overcomplicating the drawing (like the other components discussed herein).

Payment/redemption module 810 may also or instead be included and configured to perform the functionality discussed herein related to facilitating payment transactions discussed above. In some embodiments, some or all of the functionality facilitating payment transactions may be performed by processor 802. In this regard, the example processes and algorithms discussed herein can be performed by at least one processor 802 and/or payment/redemption module 810. For example, non-transitory computer readable storage media can be configured to store firmware, one or more application programs, and/or other software, which include instructions and other computer-readable program code portions that can be executed to control processors of the components of system 800 to implement various operations, including the examples shown above. As such, a series of computer-readable program code portions may be embodied in one or more computer program products and can be used, with a computing device, server, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein.

It is also noted that all or some of the information presented by the example displays discussed herein can be based on data that is received, generated and/or maintained by one or more components of system 700. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. Each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 802 and/or payment/redemption module 810 discussed above with reference to FIG. 8, to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 804) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, the block diagrams and flowchart illustrations support combinations of means for performing the specified functions, combinations of steps for performing the specified functions and program instruction means for performing the specified functions. It will also be understood that each block/step of the circuit diagrams and process flowcharts, and combinations of blocks/steps in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. For example, although the examples discussed herein do not require the consumer to present a form of payment (such as a credit card) to the merchant, some embodiments of the merchant device can be configured to work with one or more peripheral devices that can receive payment information directly from a consumer (such as a credit card reader, radio frequency identification reader, etc.) in addition to or instead of from the central system. In another example, the techniques discussed herein for wallet identifying token management may also be used to facilitate peer-to-peer payments between two consumer devices or two merchant devices, as discussed in greater detail in U.S. Provisional Patent Application No. 61/715,229, entitled "Peer-to-Peer Payment Processing," incorporated by reference in its entirety above. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising at least one processor and at least one non-transitory memory comprising program code, wherein the at least one non-transitory memory and the program code are configured to, with the at least one processor, cause the apparatus to:

identify a client application executing on a client computing device, wherein the client computing device is configured to utilize client device first communication capabilities of the client computing device and client device second communication capabilities of the client computing device, wherein the client device first communication capabilities are associated with a client device first communication range and the client device second communication capabilities are associated with a client device second communication range, the client device first communication range shorter than the client device second communication range;

generate a plurality of client application identifying tokens corresponding to the client application, wherein each client application identifying token of the plurality of client application identifying tokens is associated with a private key and client application identifying data, and wherein each client application identifying token comprises non-sensitive data;

provide the plurality of client application identifying tokens to the client application via the client device second communication capabilities;

identify a provider application executing on a provider computing device, wherein the provider computing device is configured to utilize provider device first communication capabilities and provider device second communication capabilities, wherein the provider device first communication capabilities are associated with a provider device first communication range and the provider device second communication capabilities are associated with a provider device second communication range, wherein the provider device first communication range is shorter than the provider device second communication range;

receive, from the provider application and via the provider device second communication capabilities of the provider computing device, a short-range initiation indication, wherein the short-range initiation indication indicates that the provider application has received a first identifying token from the client application executing on the client computing device via the provider device first communication capabilities of the provider computing device, the first identifying token received in response to the provider application detecting the client computing device is within a provider environment defined by the provider device first communication range;

determine a validation conclusion for the short-range initiation indication based on whether the first identifying token is among the plurality of client application identifying tokens corresponding to the client application; and in response to determining a positive validation conclusion, provide the client application identifying data to the provider application via the provider device second communication capabilities of the provider computing device.

2. The apparatus of claim 1, wherein the at least one non-transitory memory and the program code are configured to, with the at least one processor, further cause the apparatus to:

detect a connection loss with the client computing device via the client device second communication capabilities after providing the plurality of client application identifying tokens to the client application via the client device second communication capabilities.

3. The apparatus of claim 1, wherein the at least one non-transitory memory and the program code are configured to, with the at least one processor, further cause the apparatus to:

wirelessly receive, via the provider computing device, the first wallet identifying token from the consumer device utilizing the provider device first communication capabilities;

transmit, via the provider computing device, the first wallet identifying token utilizing the provider device second communication capabilities;
receive, via the provider computing device, the consumer identifying data utilizing the provider device second communication capabilities;
collect, via the provider computing device, consumer interaction data; and
transmit, via the provider computing device, the consumer interaction device utilizing the provider device second communication capabilities.

4. The apparatus of claim 1, wherein the at least one non-transitory memory and the program code are configured to, with the at least one processor, further cause the apparatus to:
receive, from the provider application and via the provider device second communication capabilities of the provider computing device, a short-range transaction indication, wherein the short-range transaction indication indicates one or more desired transactional arrangements between the consumer application and the provider application;
receive, from the provider application and via the provider device second communication capabilities of the provider computing device, a short-range termination indication, wherein the short-range termination indication indicates termination of communication between the provider application and client application via the provider device first communication capabilities of the provider computing device and the client device first communication capabilities of the client computing device; and
in response to determining the positive validation conclusion and receiving the short-range termination indication from the provider communication, perform a transaction corresponding to each of the one or more desired transactional arrangements.

5. The apparatus of claim 1, wherein the at least one non-transitory memory and the program code are configured to, with the at least one processor, further cause the apparatus to:
receive, from the provider application and via the provider device second communication capabilities of the provider computing device, a short-range authentication request indication, wherein the short-range authentication request indication indicates a request for authentication of the consumer application; and
in response to determining the positive validation conclusion and receiving the short-range authentication request indication from the provider communication, generate the authentication of the consumer application and transmit the authentication of the consumer application to the provider application.

6. The apparatus of claim 1, wherein:
each of the plurality of consumer application identifying tokens is associated with a token temporal interval;
the short-range initiation indication is associated with a timestamp; and
determining the validation conclusion is further based on whether the timestamp is within the token temporal interval.

7. The apparatus of claim 6, wherein the token temporal interval is a twelve-hour interval.

8. The apparatus of claim 1, wherein the consumer application is configured to utilize the client device first communication capabilities of the client application when the consumer application determines that the client device second communication capabilities have a strength level that fails to satisfy a long-range capability strength threshold.

9. The apparatus of claim 1, wherein the at least one non-transitory memory and the program code are configured to, with the at least one processor, further cause the apparatus to:
provide, via the client device second communication capabilities of the client application, one or more additional wallet identifying tokens to the consumer device sufficient to maintain a reserve of wallet identifying tokens at the consumer device.

10. A computer-implemented method comprising:
identifying a client application executing on a client computing device, wherein the client computing device is configured to utilize client device first communication capabilities of the client computing device and client device second communication capabilities of the client computing device, wherein the client device first communication capabilities are associated with a client device first communication range and the client device second communication capabilities are associated with a client device second communication range, the client device first communication range shorter than the client device second communication range;
generating a plurality of client application identifying tokens corresponding to the client application, wherein each client application identifying token of the plurality of client application identifying tokens is associated with a private key and client application identifying data, and wherein each client application identifying token comprises non-sensitive data;
providing the plurality of client application identifying tokens to the client application via the client device second communication capabilities;
identifying a provider application executing on a provider computing device, wherein the provider computing device is configured to utilize provider device first communication capabilities and provider device second communication capabilities, wherein the provider device first communication capabilities are associated with a provider device first communication range and the provider device second communication capabilities are associated with a provider device second communication range, wherein the provider device first communication range is shorter than the provider device second communication range;
receiving, from the provider application and via the provider device second communication capabilities of the provider computing device, a short-range initiation indication, wherein the short-range initiation indication indicates that the provider application has received a first identifying token from the client application executing on the client computing device via the provider device first communication capabilities of the provider computing device, the first identifying token received in response to the provider application detecting the client computing device is within a provider environment defined by the provider device first communication range;
determining a validation conclusion for the short-range initiation indication based on whether the first identifying token is among the plurality of client application identifying tokens corresponding to the client application; and
in response to determining a positive validation conclusion, providing the client application identifying data to the provider application via the provider device second communication capabilities of the provider computing device.

11. The computer-implemented method of claim 10, further comprising:
receiving, from the provider application and via the provider device second communication capabilities of the provider computing device, a short-range transaction indication, wherein the short-range transaction indication indicates one or more desired transactional arrangements between the consumer application and the provider application;
receiving, from the provider application and via the provider device second communication capabilities of the provider computing device, a short-range termination indication, wherein the short-range termination indication indicates termination of communication between the provider application and client application via the provider device first communication capabilities of the provider computing device and the client device first communication capabilities of the client computing device; and
in response to determining the positive validation conclusion and receiving the short-range termination indication from the provider communication, performing a transaction corresponding to each of the one or more desired transactional arrangements.

12. The computer-implemented method of claim 10, further comprising:
receiving, from the provider application and via the provider device second communication capabilities of the provider computing device, a short-range authentication request indication, wherein the short-range authentication request indication indicates a request for authentication of the consumer application; and
in response to determining the positive validation conclusion and receiving the short-range authentication request indication from the provider communication, generating the authentication of the consumer application and transmit the authentication of the consumer application to the provider application.

13. The computer-implemented method of claim 10, wherein:
each of the plurality of consumer application identifying tokens is associated with a token temporal interval;
the short-range initiation indication is associated with a timestamp; and
determining the validation conclusion is further based on whether the timestamp is within the token temporal interval.

14. The computer-implemented method of claim 13, wherein the token temporal interval is a twelve-hour interval.

15. The computer-implemented method of claim 10, wherein the consumer application is configured to utilize the client device first communication capabilities of the client application when the consumer application determines that the client device second communication capabilities have a strength level that fails to satisfy a long-range capability strength threshold.

16. The computer-implemented method of claim 10, further comprising:
providing, via the client device second communication capabilities of the client application, one or more additional wallet identifying tokens to the consumer device sufficient to maintain a reserve of wallet identifying tokens at the consumer device.

17. A computer program product comprising a non-transitory computer readable storage medium and computer program instructions stored therein, the computer program instructions comprising program instructions configured to:
identify a client application executing on a client computing device, wherein the client computing device is configured to utilize client device first communication capabilities of the client computing device and client device second communication capabilities of the client computing device, wherein the client device first communication capabilities are associated with a client device first communication range and the client device second communication capabilities are associated with a client device second communication range, the client device first communication range shorter than the client device second communication range;
generate a plurality of client application identifying tokens corresponding to the client application, wherein each client application identifying token of the plurality of client application identifying tokens is associated with a private key and client application identifying data, and wherein each client application identifying token comprises non-sensitive data;
provide the plurality of client application identifying tokens to the client application via the client device second communication capabilities;
identify a provider application executing on a provider computing device, wherein the provider computing device is configured to utilize provider device first communication capabilities of the provider computing device and provider device second communication capabilities of the provider computing device, wherein the provider device first communication capabilities are associated with a provider device first communication range and the provider device second communication capabilities are associated with a provider device second communication range, wherein the provider device first communication range is shorter than the provider device second communication range;
receive, from the provider application and via the provider device second communication capabilities of the provider computing device, a short-range initiation indication, wherein the short-range initiation indication indicates that the provider application has received a first identifying token from the client application executing on the client computing device via the provider device first communication capabilities of the provider computing device, the first identifying token received in response to the provider application detecting the client computing device is within a provider environment defined by the provider device first communication range;
determine a validation conclusion for the short-range initiation indication based on whether the first identifying token is among the plurality of client application identifying tokens corresponding to the client application; and
in response to determining a positive validation conclusion, provide the client application identifying data to the provider application via the provider device second communication capabilities of the provider computing device.

18. The computer program product of claim 17, wherein the program instructions are further configured to:
receive, from the provider application and via the provider device second communication capabilities of the provider computing device, a short-range transaction indication, wherein the short-range transaction indication indicates one or more desired transactional arrangements between the consumer application and the provider application;

receive, from the provider application and via the provider device second communication capabilities of the provider computing device, a short-range termination indication, wherein the short-range termination indication indicates termination of communication between the provider application and client application via the provider device first communication capabilities of the provider computing device and the client device first communication capabilities of the client computing device; and in response to determining the positive validation conclusion and receiving the short-range termination indication from the provider communication, perform a transaction corresponding to each of the one or more desired transactional arrangements.

19. The computer program product of claim 17, wherein the program instructions are further configured to:

receive, from the provider application and via the provider device second communication capabilities of the provider computing device, a short-range authentication request indication, wherein the short-range authentication request indication indicates a request for authentication of the consumer application; and in response to determining the positive validation conclusion and receiving the short-range authentication request indication from the provider communication, generate the authentication of the consumer application and transmit the authentication of the consumer application to the provider application.

20. The computer program product of claim 17, wherein the program instructions are further configured to:

provide, via the client device second communication capabilities of the client application, one or more additional wallet identifying tokens to the consumer device sufficient to maintain a reserve of wallet identifying tokens at the consumer device.

\* \* \* \* \*